United States Patent
Wang

(10) Patent No.: US 11,003,864 B2
(45) Date of Patent: May 11, 2021

(54) ARTIFICIAL INTELLIGENCE OPTIMIZED UNSTRUCTURED DATA ANALYTICS SYSTEMS AND METHODS

(71) Applicant: Stratifyd, Inc., Charlotte, NC (US)

(72) Inventor: Xiaoyu Wang, Charlotte, NC (US)

(73) Assignee: STRATIFYD, INC., Charlotte, NC (US)

( * ) Notice: Subject to any disclaimer, the term of this patent is extended or adjusted under 35 U.S.C. 154(b) by 310 days.

(21) Appl. No.: 15/966,081

(22) Filed: Apr. 30, 2018

(65) Prior Publication Data

US 2018/0246883 A1 Aug. 30, 2018

Related U.S. Application Data

(63) Continuation-in-part of application No. 15/151,572, filed on May 11, 2016, now Pat. No. 10,452,698.

(51) Int. Cl.

| | |
|---|---|
| *G06F 40/44* | (2020.01) |
| *G06F 16/34* | (2019.01) |
| *G06N 3/08* | (2006.01) |
| *G06F 16/35* | (2019.01) |
| *G06F 17/18* | (2006.01) |
| *G06N 7/00* | (2006.01) |
| *G06N 5/04* | (2006.01) |
| *G06F 40/20* | (2020.01) |
| *G06F 40/30* | (2020.01) |
| *G06F 40/295* | (2020.01) |
| *G06N 5/00* | (2006.01) |

(Continued)

(52) U.S. Cl.
CPC .............. *G06F 40/44* (2020.01); *G06F 16/34* (2019.01); *G06F 16/35* (2019.01); *G06F 16/355* (2019.01); *G06F 16/358* (2019.01); *G06F 17/18* (2013.01); *G06F 40/20* (2020.01); *G06F 40/295* (2020.01); *G06F 40/30* (2020.01); *G06N 3/08* (2013.01); *G06N 5/045* (2013.01); *G06N 7/005* (2013.01); *G06N 5/003* (2013.01); *G06N 5/022* (2013.01); *G06N 20/10* (2019.01)

(58) Field of Classification Search
CPC ......... G06F 16/34; G06F 16/35; G06F 16/355
USPC ....................................................... 707/739
See application file for complete search history.

(56) References Cited

U.S. PATENT DOCUMENTS

| | | | |
|---|---|---|---|
| 9,892,362 B2* | 2/2018 | Adderly ................. | G06N 5/022 |
| 2007/0073748 A1* | 3/2007 | Barney ............... | G06F 16/2465 |

(Continued)

*Primary Examiner* — Shahid A Alam
(74) *Attorney, Agent, or Firm* — Morris, Manning & Martin, LLP; Daniel E. Sineway, Esq.

(57) ABSTRACT

An artificial intelligence data analytics system, including: a data analytics algorithm accessible by an analyst operable for receiving data from one or more sources, applying one or more analytical tools to the data, and displaying summary information to the analyst; an artificial intelligence algorithm accessible by the analyst operable for applying a preferred artificial intelligence methodology to the data and automatically triggering and executing an action on behalf of the analyst; and an artificial intelligence learning algorithm accessible by the analyst operable for statistically scoring a plurality of potential artificial intelligence methodologies to be used by the artificial intelligence algorithm, receiving a corresponding analyst preference as to the preferred artificial intelligence methodology, and causing the artificial intelligence algorithm to utilize the preferred artificial intelligence methodology.

14 Claims, 16 Drawing Sheets

(51) Int. Cl.
  *G06N 20/10* (2019.01)
  *G06N 5/02* (2006.01)

(56) References Cited

U.S. PATENT DOCUMENTS

| | | | |
|---|---|---|---|
| 2009/0138415 A1* | 5/2009 | Lancaster | G06N 5/04 706/11 |
| 2012/0030729 A1* | 2/2012 | Schwartz | G06Q 10/0633 726/1 |
| 2013/0185644 A1* | 7/2013 | Kitano | G06F 16/9024 715/736 |
| 2014/0304200 A1* | 10/2014 | Wall | G16H 10/20 706/12 |
| 2015/0106123 A1* | 4/2015 | Amarasingham | G16H 10/60 705/3 |
| 2016/0203217 A1* | 7/2016 | Anisingaraju | G06F 16/3344 707/738 |

* cited by examiner

ARTIFICIAL INTELLIGENCE OPTIMIZED UNSTRUCTURED DATA ANALYTICS SYSTEMS AND METHODS

CROSS-REFERENCE TO RELATED APPLICATION

The present patent application/patent is a continuation-in-part (CIP) of copending U.S. patent application Ser. No. 15/151,572, filed on May 11, 2016, and entitled "UNSTRUCTURED DATA ANALYTICS SYSTEMS AND METHODS," the contents of which are incorporated in full by reference herein.

FIELD OF THE INVENTION

The present invention relates generally to methods and systems for the analysis of large text corpora and unstructured data. More specifically, the present invention relates to methods and systems for the analysis of large text corpora and unstructured data using visual analytics and topic modeling, a visualization interface, and natural language processing and statistics functions. Importantly, an artificial intelligence (AI) learning module is provided and operates on existing data sets such that an analyst may optimize and automate the methods and systems for the analysis of large text corpora and unstructured data such that the optimized and automated methods and systems for the analysis of large text corpora and unstructured data may then be applied to new data sets. This effectively shifts company AI to an analyst level for enhanced performance.

BACKGROUND OF THE INVENTION

The management of large and growing collections of text information and unstructured data is a challenging problem for analysts. Data repositories of knowledge-rich text information have become widely accessible, leading to an overwhelming amount of data to organize, explore, and analyze. As the number of documents increases, learning the meaning of the text corpora becomes cognitively costly and time consuming.

The challenge of the automated summarization of large text corpora has been a primary area of interest for researchers in the Natural Language Processing (NLP) domain. In order to summarize a text corpus, researchers have developed techniques such as Latent Semantic Analysis (LSA) for extracting and representing the contextual-usage meaning of words. LSA produces a concept space which can be used for document classification and clustering. More recently, probabilistic topic models have emerged as a powerful new technique for finding semantically meaningful topics in an unstructured text collection. In order to further provide a visual summary of text corpora, researchers from the knowledge discovery and visualization community have developed tools and techniques to support the visualization and exploration of large text corpora based on both LSA and probabilistic topic models.

Although probabilistic topic models have demonstrated their advantages in interpretability and semantic association, few interactive visualization systems have leveraged such models to support the exploration and analysis of text corpora. The exemplar-based visualization and probabilistic latent semantic visualization approaches have projected documents onto static two-dimensional (2D) plots while estimating the topics of a text corpus. Although the clusters of documents conform well to the chosen labels, there is little opportunity for the interactive exploration and analysis of the document clusters. One exception is the time-based visualization system TIARA, which applies the ThemeRiver metaphor to visually summarize a text collection based on the topic content. Through analysis with the TIARA system, users can answer questions such as: what are the major topics in the document corpus? and how have the topics evolved over time?

However, when analyzing large text corpora, there are many other real-world questions that current text analysis visualization systems have difficulty answering. In particular, questions pertaining to the relationships between topics and documents are difficult to answer with existing tools. Such questions include: what are the characteristics of the documents based on their topical distribution? and what documents contain multiple topics at once (and what are they)? In the field of science policies, for example, documents with multiple topics could indicate publications that are interdisciplinary (i.e. that cover more than one body of knowledge). Similarly, in the context of social media analysis, a document with multiple topics may signify a unique news article that is relevant to different hot topics.

In order to overcome the shortcomings associated with prior methods and systems, and in order to help users more effectively make sense of large text corpora, the present invention provides a novel visual analytics system that integrates a state-of-the-art probabilistic topic model, Latent Dirichlet Allocation (LDA), with interactive visualization. In order to describe a corpus of documents, the methods and systems of the present invention first extract a set of semantically meaningful topics using LDA. Unlike most traditional clustering techniques, in which a document is assigned to a specific cluster, the LDA model accounts for different topical aspects of each individual document. This permits the effective full text analysis of larger documents that may contain multiple topics. In order to highlight this property of the model, the methods and systems of the present invention utilize the parallel coordinate metaphor to present the probabilistic distribution of a document across topics. Such a representation allows users to discover single-topic vs. multi-topic documents and the relative importance of each topic to a document of interest. In addition, since most text corpora are inherently temporal, the systems and methods of the present invention also depict the topic evolution over time.

Further, the present invention enables companies, including analysts, marketers, business unit leaders, information technology personnel, and the C-suite, to gain actionable insight from any type of textual data. The technology allows people to augment their decision making processes from data driven foundations. The technology ingests textual data and, through deep computing and statistical algorithms, identifies the themes, topics, and emerging issues within each data set. Results are displayed in an interactive, visualized format so that anyone in the company can analyze data holistically or granularly. All types of textual data can be analyzed—internal data, such as emails, chats, surveys, call centers, and focus groups, or external data, such as social media, review sites, forums, and news sites. The technology can process a multitude of languages, ensuring that feedback loops from around the world can be analyzed. The highly customizable features let one tailor analysis efforts however is chosen. Most companies are sitting on treasure troves of unstructured textual data with little ability to mine it for intelligence.

Finally, an AI learning module is provided and operates on existing data sets such that an analyst may optimize and automate the methods and systems for the analysis of large text corpora and unstructured data such that the optimized and automated methods and systems for the analysis of large text corpora and unstructured data may then be applied to new data sets. This effectively shifts company AI to an analyst level for enhanced performance.

BRIEF SUMMARY OF THE INVENTION

Again, in various exemplary embodiments, the methods and systems of the present invention tightly integrate interactive visualization with a state-of-the-art probabilistic topic model. Specifically, in order to answer the questions posed herein above, the methods and systems of the present invention utilize the Parallel Coordinate (PC) metaphor to present a probabilistic distribution of a document across topics. This carefully chosen representation not only shows how many topics a document is related to, but also the importance of each topic to the document. Moreover, the methods and systems of the present invention provide a rich set of interactions that can help users to automatically divide a document collection based on the number of topics in the documents. In addition to depicting the relationships between topics and documents, methods and systems of the present invention also support other tasks that are essential to understanding a document collection, such as summarizing the document collection into major topics, and illustrating how the topics evolve over time.

The set of questions that the methods and systems of the present invention can effectively address when analyzing large text corpora include: what are the major topics that capture the document collection? what are the characteristics of the documents based on their topical distribution? what documents address multiple topics at once? and how do the topics of interest evolve over time? In order to help users answer these questions, the methods and systems of the present invention first extract a set of semantically meaningful topics using the LDA model. In order to support visual exploration of a document collection based on the topic model, the methods and systems of the present invention employ multiple coordinated views to highlight both topical and temporal features of document corpora. One novel contribution of the methods and systems of the present invention lies in the depiction of the probabilistic distributions of documents over topics and supporting interactive identification and more detailed examination of single-topic and multi-topic documents.

Again, an AI learning module is provided and operates on existing data sets such that an analyst may optimize and automate the methods and systems for the analysis of large text corpora and unstructured data such that the optimized and automated methods and systems for the analysis of large text corpora and unstructured data may then be applied to new data sets. This effectively shifts company AI to an analyst level for enhanced performance.

In one exemplary embodiment, the present invention provides a computerized method for the analysis of textual data, including: receiving, from one or more memories at one or more processors, textual data to be analyzed; using the one or more processors, formatting the textual data for subsequent analysis; using the one or more processors, applying a probabilistic topic model to the textual data to extract a set of semantically meaningful topics that collectively describe all or a portion of the textual data; using a keyword weighting module executed on the one or more processors, generating a topic cloud view representing the topics as a tagcloud with each being associated with a plurality of keywords; using a topic ordering module executed on the one or more processors, generating a document distribution view representing a distribution of all or a portion of the textual data across multiple topics; using a document entropy calculation module executed on the one or more processors, generating a document scatterplot view representing how many topics are attributable to all or a portion of the textual data; using a temporal topic trend calculation module executed on the one or more processors, generating a temporal view representing changes in the occurrence of topics over time in relation to all or a portion of the textual data; and displaying one or more of the topic cloud view, the document distribution view, the document scatterplot view, and the temporal view to a user in the analysis of all or a portion of the textual data. The textual data includes one or more of textual data derived from a plurality of documents, textual data derived from a plurality of files, textual data derived from one or more data storage repositories, and textual data derived from the Internet. The probabilistic topic model generates a set of latent topics and represents each topic as a multinomial distribution over a plurality of keywords. The textual data is described as a probabilistic mixture of topics. Optionally, the keywords are ordered to indicate their importance to a given topic and relationship to one another. Optionally, the keywords are highlighted to indicate their importance to multiple topics. The topics are ordered to represent their relationships. Numerous other exemplary functionalities are provided herein as well.

In another exemplary embodiment, the present invention provides a computerized system for the analysis of textual data, including: one or more memories operable for storing and one or more processors operable for receiving textual data to be analyzed; an algorithm executed on the one or more processors operable for formatting the textual data for subsequent analysis; an algorithm executed on the one or more processors operable for applying a probabilistic topic model to the textual data to extract a set of semantically meaningful topics that collectively describe all or a portion of the textual data; a keyword weighting module executed on the one or more processors operable for generating a topic cloud view representing the topics as a tagcloud with each being associated with a plurality of keywords; a topic ordering module executed on the one or more processors operable for generating a document distribution view representing a distribution of all or a portion of the textual data across multiple topics; a document entropy calculation module executed on the one or more processors operable for generating a document scatterplot view representing how many topics are attributable to all or a portion of the textual data; a temporal topic trend calculation module executed on the one or more processors operable for generating a temporal view representing changes in the occurrence of topics over time in relation to all or a portion of the textual data; and a display operable for displaying one or more of the topic cloud view, the document distribution view, the document scatterplot view, and the temporal view to a user in the analysis of all or a portion of the textual data. The textual data includes one or more of textual data derived from a plurality of documents, textual data derived from a plurality of files, textual data derived from one or more data storage repositories, and textual data derived from the Internet. The probabilistic topic model generates a set of latent topics and represents each topic as a multinomial distribution over a plurality of keywords. The textual data is described as a probabilistic mixture of topics. Optionally, the keywords are ordered to indicate their importance to a given topic and relationship to one another. Optionally, the keywords are highlighted to indicate their importance to multiple topics. The topics are ordered to represent their relationships. Numerous other exemplary functionalities are provided herein as well.

Again, the present invention enables companies, including analysts, marketers, business unit leaders, information technology personnel, and the C-suite, to gain actionable insight from any type of textual data. The technology allows people to augment their decision making processes from data driven foundations. The technology ingests textual data and, through deep computing and statistical algorithms, identifies the themes, topics, and emerging issues within each data set. Results are displayed in an interactive, visualized format so that anyone in the company can analyze data holistically or granularly. All types of textual data can be analyzed—internal data, such as emails, chats, surveys, call centers, and focus groups, or external data, such as social media, review sites, forums, and news sites. The technology can process a multitude of languages, ensuring that feedback loops from around the world can be analyzed. The highly customizable features let one tailor analysis efforts however is chosen. Most companies are sitting on treasure troves of unstructured textual data with little ability to mine it for intelligence.

In a further exemplary embodiment, the present invention provides an unstructured data analytics system, including: an unstructured data analytics algorithm resident on a server and accessible via a browser operable for receiving unstructured data from one or more remote sources, applying one or more analytical tools to the unstructured data, and displaying summary information to one or more users; wherein the summary information is displayed to the one or more users in one or more of a presentation layer, an exploration layer, and an annotation layer. The unstructured data includes one or more of customer experience data, telecom data, email data, and social media data. The unstructured data analytics algorithm is also operable for receiving outside data from one or more remote sources. The outside data includes one or more of Internet data, government data, and business data. The one or more analytical tools applied to the unstructured data include one or more of a statistical algorithm, machine learning, natural language processing, and text mining. The presentation layer displays one or more of the unstructured data a summary of the unstructured data, and the summary information. The exploration layers allows the one or more users to modify the granularity of the summary information, thereby modifying the granularity of the presentation layer. The one or more users can interact with the unstructured data analytics system simultaneously via the annotation layer. The summary information is also displayed to the one or more users in a combination layer.

In a still further exemplary embodiment, the present invention provides an unstructured data analytics method, including: providing an unstructured data analytics algorithm resident on a server and accessible via a browser operable for receiving unstructured data from one or more remote sources, applying one or more analytical tools to the unstructured data, and displaying summary information to one or more users; wherein the summary information is displayed to the one or more users in one or more of a presentation layer, an exploration layer, and an annotation layer. The unstructured data includes one or more of customer experience data, telecom data, email data, and social media data. The unstructured data analytics algorithm is also operable for receiving outside data from one or more remote sources. The outside data includes one or more of Internet data, government data, and business data. The one or more analytical tools applied to the unstructured data include one or more of a statistical algorithm, machine learning, natural language processing, and text mining. The presentation layer displays one or more of the unstructured data a summary of the unstructured data, and the summary information. The exploration layers allows the one or more users to modify the granularity of the summary information, thereby modifying the granularity of the presentation layer. The one or more users can interact with the unstructured data analytics system simultaneously via the annotation layer. The summary information is also displayed to the one or more users in a combination layer.

In a still further exemplary embodiment, the present invention provides an artificial intelligence data analytics system, including: a data analytics algorithm accessible by an analyst operable for receiving data from one or more sources, applying one or more analytical tools to the data, and displaying summary information to the analyst; an artificial intelligence algorithm accessible by the analyst operable for applying a preferred artificial intelligence methodology to the data and automatically triggering and executing an action on behalf of the analyst; and an artificial intelligence learning algorithm accessible by the analyst operable for statistically scoring a plurality of potential artificial intelligence methodologies to be used by the artificial intelligence algorithm, receiving a corresponding analyst preference as to the preferred artificial intelligence methodology, and causing the artificial intelligence algorithm to utilize the preferred artificial intelligence methodology. The data includes one or more of internal data and external data relative to an entity. The data analytics algorithm performs natural language understanding, topic modeling, entity recognition, and predictive analysis. The action triggered and executed on behalf of the analyst by the artificial intelligence algorithm includes one or more of sending a text message, sending an email, performing a customer marketing strategy/service marketing strategy action, scoring the analyst, and performing a reporting function, for example. The artificial intelligence learning algorithm implements one or more of a loyalty model, a performance evaluation model, a satisfaction model, a knowledge base expansion model, and a recommendation system model. The data is iteratively optimized based on feedback from the artificial intelligence learning algorithm such that the statistical scores of the plurality of potential artificial intelligence methodologies are improved. The artificial intelligence methodology implemented includes one or more of a decision tree, a naive Bayes classification, an ordinary least squares regression, a logistic regression, a support vector machine, an ensemble method, a clustering algorithm, a principal component analysis, a singular value decomposition, and an independent component analysis, for example.

In a still further exemplary embodiment, the present invention provides a method for providing an artificial intelligence data analytics system, including: providing a data analytics algorithm accessible by an analyst operable for receiving data from one or more sources, applying one or more analytical tools to the data, and displaying summary information to the analyst; providing an artificial intelligence algorithm accessible by the analyst operable for applying a preferred artificial intelligence methodology to the data and automatically triggering and executing an action on behalf of the analyst; and providing an artificial intelligence learning algorithm accessible by the analyst operable for statistically scoring a plurality of potential artificial intelligence methodologies to be used by the artificial intelligence algorithm, receiving a corresponding analyst preference as to the preferred artificial intelligence methodology, and causing the artificial intelligence algorithm to utilize the preferred artificial intelligence methodology. The data includes one or more of internal data and external data relative to an entity. The data analytics algorithm performs natural language understanding, topic modeling, entity recognition, and predictive analysis. The action triggered and executed on behalf of the analyst by the artificial intelligence algorithm includes one or more of sending a text message, sending an email, performing a customer marketing strategy/service marketing strategy action, scoring the analyst, and performing a reporting function, for example. The artificial intelligence learning algorithm implements one or more of a loyalty model, a performance evaluation model, a satisfaction model, a knowledge base expansion model, and a recommendation system model. The method also includes iteratively optimizing the data based on feedback from the artificial intelligence learning algorithm such that the statistical scores of the plurality of potential artificial intelligence methodologies are improved. The artificial intelligence methodology implemented includes one or more of a decision tree, a naive Bayes classification, an ordinary least squares regression, a logistic regression, a support vector machine, an ensemble method, a clustering algorithm, a principal component analysis, a singular value decomposition, and an independent component analysis, for example.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Figure 1:
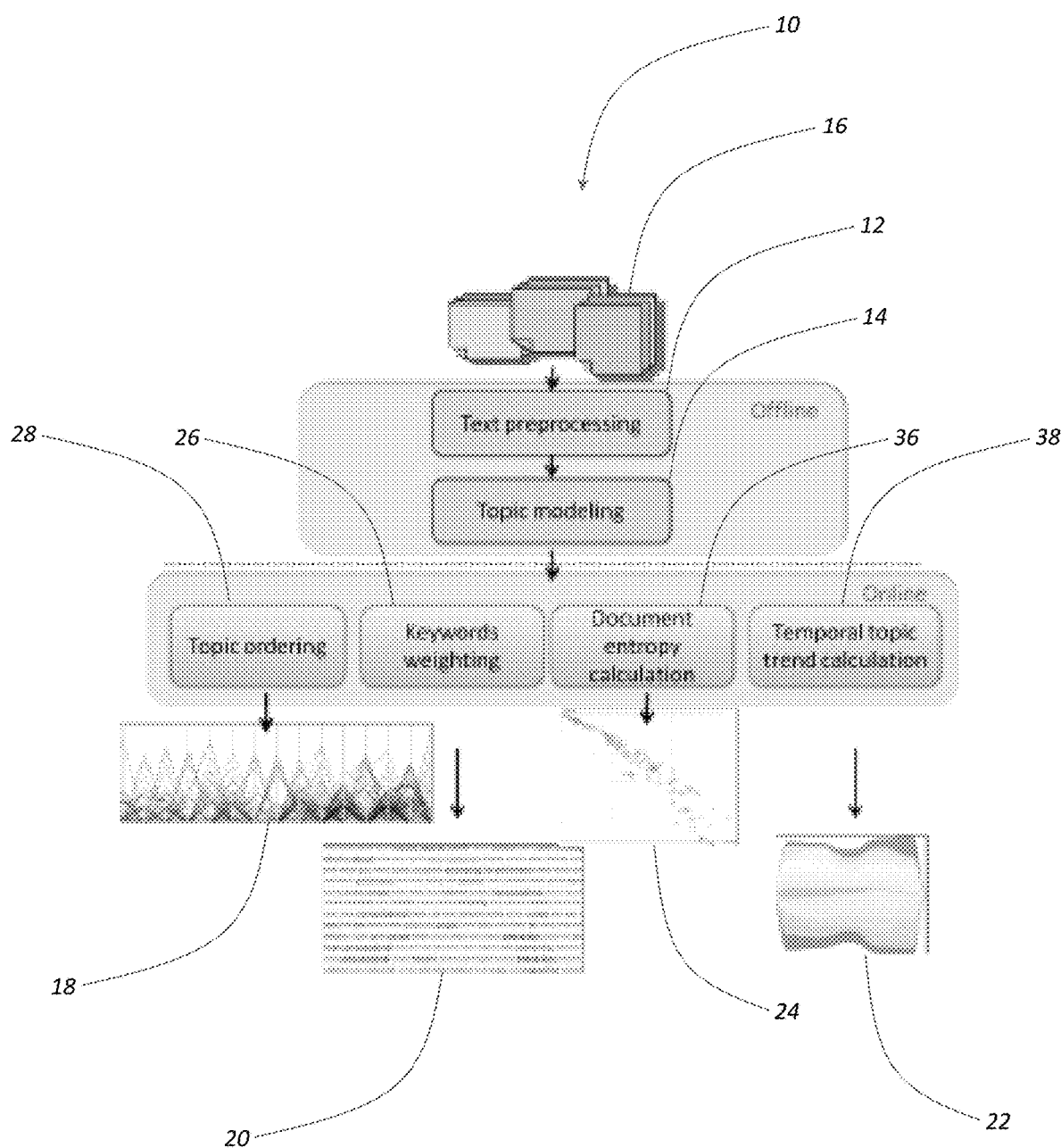
FIG. 1 is a schematic diagram illustrating one exemplary embodiment of the visual text corpora analysis tool of the present invention.

Two lines of work, namely text analysis models and text visualization techniques, are the main inspiration for the rudimentary design of the present invention. These concepts are then refined and expanded upon, as is described in greater detail herein below.

The first major advance in text processing was the Vector Space Model (VSM). In this model, a document is represented as a vector in a high-dimensional space, where each dimension is associated with one unique term within the document. One well-known example of the VSM is the TF-IDF, which evaluates how important a word is to a document in a corpus. Although the VSM has empirically shown its effectiveness, it suffers from a number of inherent shortcomings to capture inter and intra-document statistical structure.

In order to address the shortcomings of the VSM, researchers have introduced LSA, which is a factor analysis that reduces the term-document matrix to a much lower dimension subspace that captures most of the variance in the corpus. Although LSA overcomes some of the drawbacks of the VSM, it has its limitations as well. The new feature space is difficult to interpret, since each dimension is a linear combination of a set of words from the original space.

Being aware of the limitations of LSA, researchers have proposed generative probabilistic models to document modeling. For example, researchers have introduced a generative model that represents the content of words and documents with probabilistic topics instead of a purely spatial representation. One distinct advantage of such representation is that each topic is individually interpretable, providing a probability distribution over words that picks out a coherent cluster of correlated terms. The LDA model postulates a latent structure consisting of a set of topics; each document is produced by choosing a distribution over topics, and then generating each word at random from a topic chosen by using this distribution. The extracted topics capture meaningful structure in the otherwise unstructured data, as shown by analyzing scientific abstracts and newspaper archives, for example. On a cognitive level, the LDA model performs well in predicting word association and the effects of semantic association and ambiguity on a variety of language-processing and memory tasks.

Because of the various advantages of the LDA model, the methods and systems of the present invention first utilize the model to extract a set of semantically meaningful topics given a text corpus. The methods and systems of the present invention then present the probabilistic results in an intuitive manner, to make the complex model easily consumable by users when analyzing large text corpora.

Despite advances in automatic text processing techniques, human intelligence still plays a key role when analyzing text corpora. Therefore, a number of visualization systems and techniques have been developed based on the text processing methods to keep users in the loop.

Utilizing the VSM, for example, tools have been introduced to visualize email content with the purpose of portraying relationships from conversational histories. The keywords within the visualization are generated based on the TF-IDF algorithm.

Other tools enable users to visually explore text corpora through a social network metaphor based on latent semantic analysis results. Other visualization systems have used multidimensional projection methods (e.g. Principal Components Analysis (PCA) and/or Multidimensional Scaling (MDS)) to visualize text corpora. These projection techniques are similar to LSA in spirit, as they represent the documents as vectors with term frequency as their features and then identify a lower-dimension projection space. Visualization systems are thus based on these projection techniques, including IN-SPIRE. More recently, to visualize large classified document collections, others have proposed a two-stage framework for a topology-based projection and visualization tool. Unlike most traditional clustering techniques, in which a document is assigned to a specific cluster, however, the methods and systems of the present invention account for different topical aspects of each individual document.

Since the debut of topic models, visualization systems have utilized such models for their advantages over previous text processing techniques. The exemplar-based visualization and probabilistic latent semantic visualization tools have projected documents onto static 2D plots while estimating topics of a text corpus. Although the visual clustering results are better than the ones obtained from the multidimensional projection methods, there are several limitations. First, as the number of extracted topics grows, the document clusters in the 2D projection are no longer separable based on topics. Further, there is little room in these visualization tools for interactive exploration and analysis of the document clusters. Most recently, TIARA has been introduced, a time-based interactive visualization system that presents the extracted topics from a given text corpus in a time-sensitive manner. TIARA provides a good overview of the topics with respect to their evolution over time. However, the relationship between documents and topics is less clear.

Thus, the methods and systems of the present invention present the probabilistic distribution of documents across the extracted topics in addition to describing topic evolution over time. Thus, the methods and systems of the present invention provide an overview of the characteristics of documents based on their topical distribution and enable users to identify documents that address multiple topics at once.

The methods and systems of the present invention support the exploration of a document collection on multiple levels. On the overview level, the system assists users in answering questions such as: what are the major topics of the document collection? and what are the characteristics of the documents in this collection? On the facet level, the system supports activities such as identifying the temporal trends of a specific topic and identifying documents that are related to multiple topics of interest. On the detailed level, the system allows access to details of each individual document on demand. Based on the state-of-the-art topic model, the system employs multiple coordinated views, with each view addressing one of the aforementioned questions.

Referring now specifically to FIG. 1, in one exemplary embodiment, the overall architecture of the visual text corpora analysis tool 10 of the present invention includes offline text preprocessing and topic modeling modules 12 and 14. The text preprocessing module 12 is operable for putting the text of the relevant documents 16 in a proper condition for later processing, exploration, and analysis. Such text preprocessing can include, but is not limited to, the preprocessing of text from social media (e.g., Twitter posts and Facebook profiles), books (e.g., literature from the Gutenberg online book project), and other documents (e.g., Emails, Word documents, etc.).

As discussed above, topic models have several advantages over traditional text processing techniques. Therefore, the visual text corpora analysis tool 10 of the present invention employs a probabilistic topic model in the topic modeling module 14 to summarize the relevant documents 16. More specifically, LDA is used to first extract a set of semantically meaningful topics. LDA generates a set of latent topics, with each topic represented as a multinomial distribution over keywords, and assumes that each document can be described as a probabilistic mixture of these topics. P(z) is the distribution over topics z in a particular document. It is assumed that the text collection 16 consists of D documents and T topics. Determining the topics is an iterative process using the visual text corpora analysis tool 10. This tool 10 enables users to interactively specify a number of topics are deemed to be necessary in their analysis domains. It allows the users to modify the topic-modeling module 14 based on findings from their visual interactions and investigations, enabling them to modify the number of topics and/or define the number of iterations of the process. The visual text corpora analysis tool 10 further enables users to add, remove, and merge topics from the topic modeling module 14.

Thus, the document collection 16 is first preprocessed to remove stopwords, etc. Then, the Stanford Topic Modeling Toolbox (STMT) or the like is used to extract a set of topics from the document collection 16. The extracted topics and probabilistic document distributions serve as input to the further visualizations.

The visual design of the tool 10 of the present invention includes four coordinated overviews that can be displayed and manipulated, either singly or in combination, on an appropriate graphical user interface (GUI): (1) a document distribution view 18 that displays the probabilistic distribution of documents across topics; (2) a topic cloud 20 that presents the content of the extracted topics; (3) a temporal view 22 that highlights the temporal evolution of topics; and (4) a document scatterplot view 24 that facilitates interactive selection of single-topic vs. multi-topic documents. Each of the four overviews serves a distinct purpose, and they are coordinated through a rich set of user interactions. In addition, upon the selection of any document, a detail view presents the text content of that document on demand.

Figure 2:
FIG. 2 is an exemplary display illustrating a topic cloud view of the visual text corpora analysis tool of the present invention.

In order to help users quickly grasp the gist of a document collection, the major topics are presented as a tagcloud in the topic cloud view 20. In the topic cloud view 20, each line displays a topic, for example, which consists of multiple keywords related to that topic. Since each topic is modeled as a multinomial distribution over keywords, the weight of each keyword indicates its importance to the topic. In order to encapsulate such information in the tagcloud, keywords are aligned from left to right, with the most important keywords at the beginning. In addition, since one keyword may appear in multiple topics, the display size or weight of each keyword reflects its occurrences within all topics. It will be readily apparent to those of ordinary skill in the art that other configurations can, however, be utilized. An example of the topic cloud view 20 is provided in FIG. 2. In order to assist users in understanding the major topics in a document collection 16, the topics are presented in a sequence such that semantically similar topics are close together so that there is continuity when scanning over the topics sequentially. Since the LDA model does not model the relationship between topics, the topics are reordered by defining a similarity metric. The visual text corpora analysis tool 10 utilizes a Hellinger Distance function to characterize the similarity metric, denoting how close the topics are. The visual text corpora analysis tool 10 visualizes the similarity metric to provide users semantic-level understandings of the topic distributions and helps to reduce their cognitive overload by clustering the topic space.

The topic cloud view 20 also provides users with a set of interactions to help users quickly make sense of the topics. For example, hovering over a particular keyword highlights all other occurrences of that keyword in the tagcloud. A user may also search for a particular keyword of interest. In addition, the topic cloud view 20 is tightly coordinated with all other views to promptly provide information regarding a specific topic on demand.

The topic cloud view 20 is generated, in part, by an online keyword weighting module 26 that is operable for aggregating the topic modeling module's results. It sorts words in any given topic based on their probabilities in that topic, more probable words will be placed in the top of the sorting queue. This probability value is denoted by values computed by the topic modeling module 14. The size of a word in the topic cloud view, for example, is determined by the frequency of the appearance of that word across the entire text corpora and normalized based on the maximum word frequency. The higher the frequency, the larger the word, for example. The tool 10, by default, represents the most probable 50 words for each topic, for example. The number of the words can be interactively modified by the users.

Figure 3:
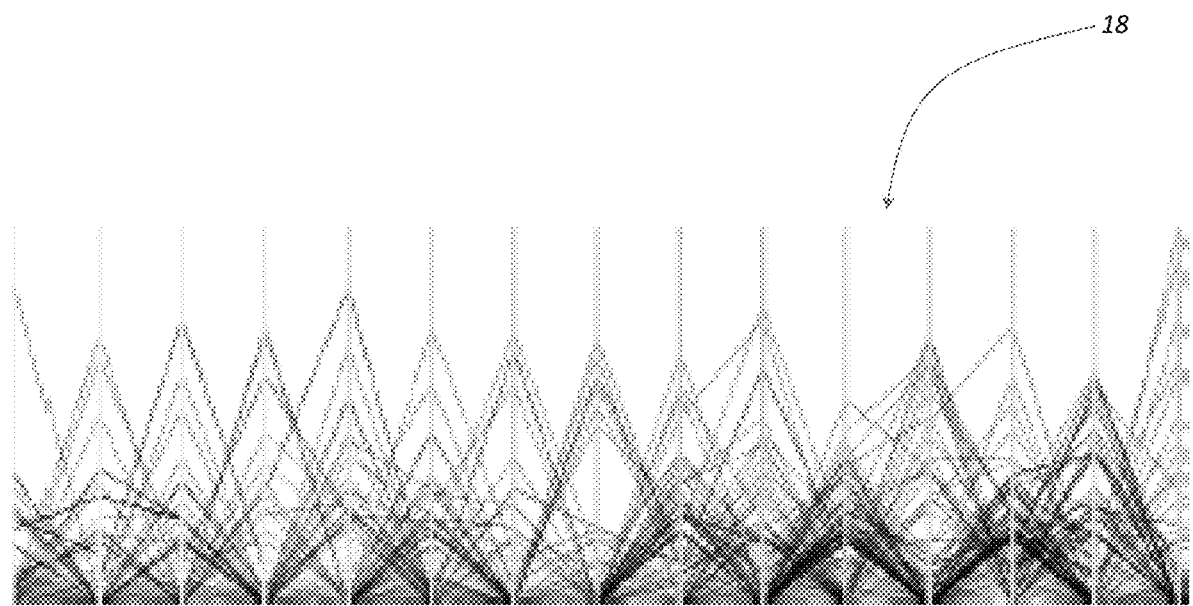
FIG. 3 is an exemplary display illustrating a document distribution view of the visual text corpora analysis tool of the present invention.

In order to provide an overview of documents as mixtures of topics, the tool 10 of the present invention highlights the distribution of each document across all extracted topics. The chosen representation converts the documents probabilistic distributions to signal-like patterns that signify each document. More specifically, the parallel coordinate metaphor is adopted, with each axis denoting a topic and each line representing a document in the collection 16. This is illustrated in FIG. 3. In this chosen configuration, all variables (i.e. topics) are uniformly spaced, and every variable shares the same value range from 0 to 1. Therefore, when viewing the document distribution view 18, it is not necessary to make sense of a document based on its value on each individual axis, but, rather, based on the pattern across all axes as a whole. It will be readily apparent to those of ordinary skill in the art that other configurations can, however, be utilized.

One limitation of LDA is that it does not directly model the correlation between the occurrences of topics, but in most text corpora, it is natural to expect the correlation between the occurrences of topics. The tool 10 of the present invention uses visualization to overcome this limitation by making the correlations between topics more salient. Coincidentally, one characteristic of the parallel coordinate visualization is that correlations between adjacent axes are much easier to discover. Therefore, topics can be ordered in a manner such that semantically similar topics are next to each other, so that correlations between similar topics become visually salient. This topic similarity is defined as the Euclidean distance between two topics among all documents 16:

$$\text{distance}(i, j) = \sum_{k=1}^{D} (P(d_k \mid z = i) - P(d_k \mid z = j))^2$$

where $d_k$ is one out of D documents in the entire collection 16 and $P(d_k)$ is the probabilistic distribution of the kth document over all topics. Therefore, $P(d_k|z=i)$ represents the probability of topic i in generating document k. When plotting the topics as axes in the chosen interface, one starts with a topic with the most probabilistic concentration and then looks for the most similar topic to the current topic based on their distances. FIG. 3 demonstrates the visualization of documents across topics after topic reordering. The relationship between any two most similar topics (i.e. on adjacent axes) becomes visually identifiable.

The document distribution view 18 is generated, in part, by an online topic ordering module 28 that is operable for performing the above functions, as well as the representation of the signal of an individual document. Such signal is an illustration of the diverse nature of a document. The view 18 shows that documents with significant distributions on a single topic are very focused on a specific subject, whereas documents with distributions on two or three topics indicate transformative foci.

Figure 4:
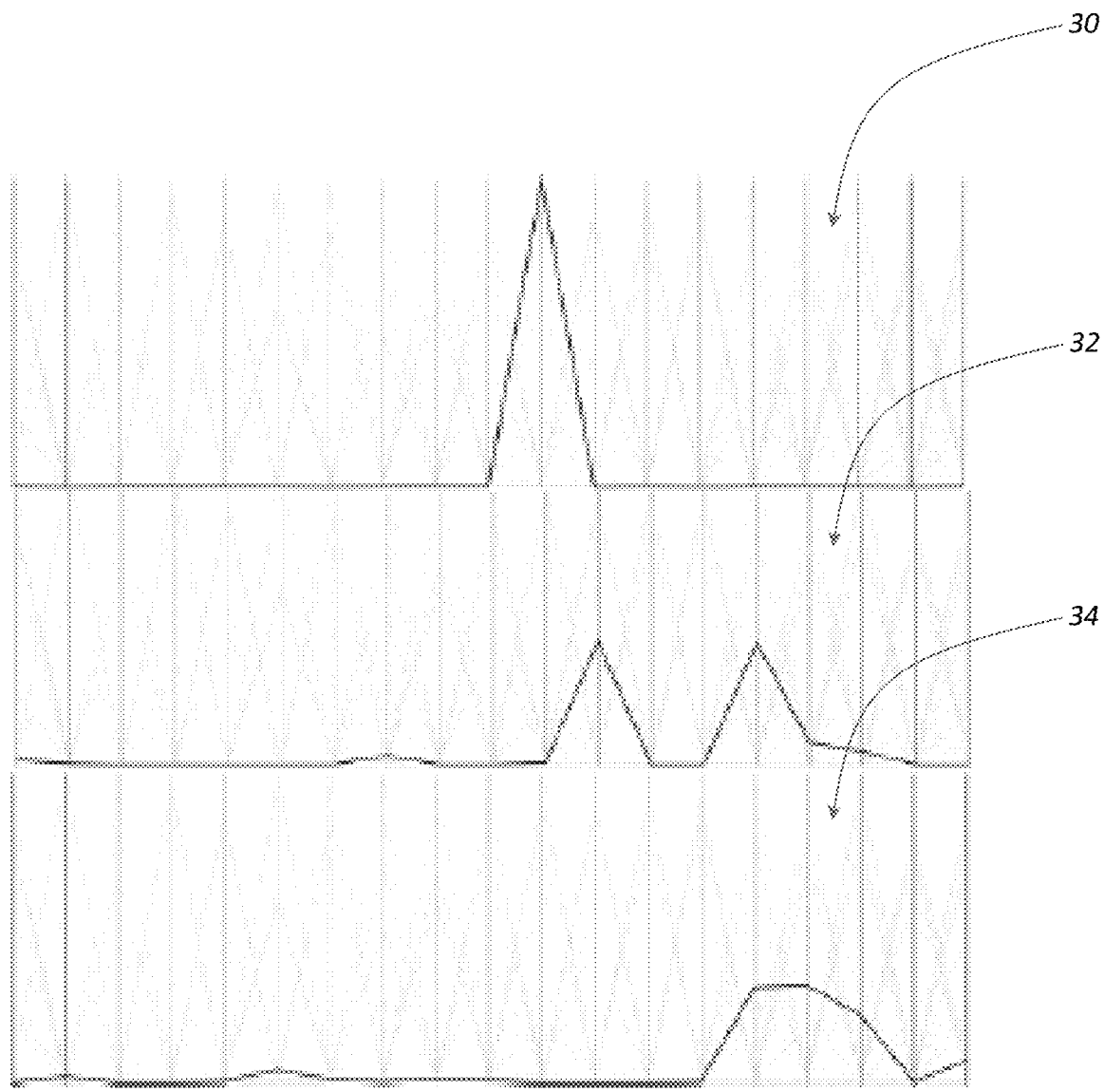
FIG. 4 is a series of plots illustrating document distribution over one topic, two topics, and more than two topics, in accordance with the methods and systems of the present invention.

When exploring the document distribution over topics, one can easily discover that given documents present different characteristics based on the number of topics they have. FIG. 4 illustrates documents that focus on only one topic 30, two topics 32, and more than two topics 34. Different numbers of topics within documents can be interpreted as distinct characteristics given a context of the text collection 16. For example, in a collection of scientific publications, documents with one topic denote publications related to a specific research field. Documents with two or more topics are more likely to represent interdisciplinary research articles, which often integrate two or more bodies of specialized knowledge.

In addition, the document distribution view 18 provides a rich set of interactions, such as brushing, highlighting, etc. Brushing a probability range on a topic allows users to select documents that have a certain probability for that specific topic. Through synthesizing the information from both the topic cloud view 20 and the document distribution view 18 on the major topics and document characteristics, a user can effectively develop an overview of the document collection 16.

The document distribution view 18 enables users to identify documents that focus on a specific topic through brushing the top range on the topic. However, identifying documents that are related to two or more topics in a large corpus is not as straightforward, since they are shadowed by the high probability values of the single-topic documents. To alleviate this problem, all documents are separated in such a way that single-topic and multi-topic documents are easily separable. This is the document scatterplot view 24.

Figure 5:
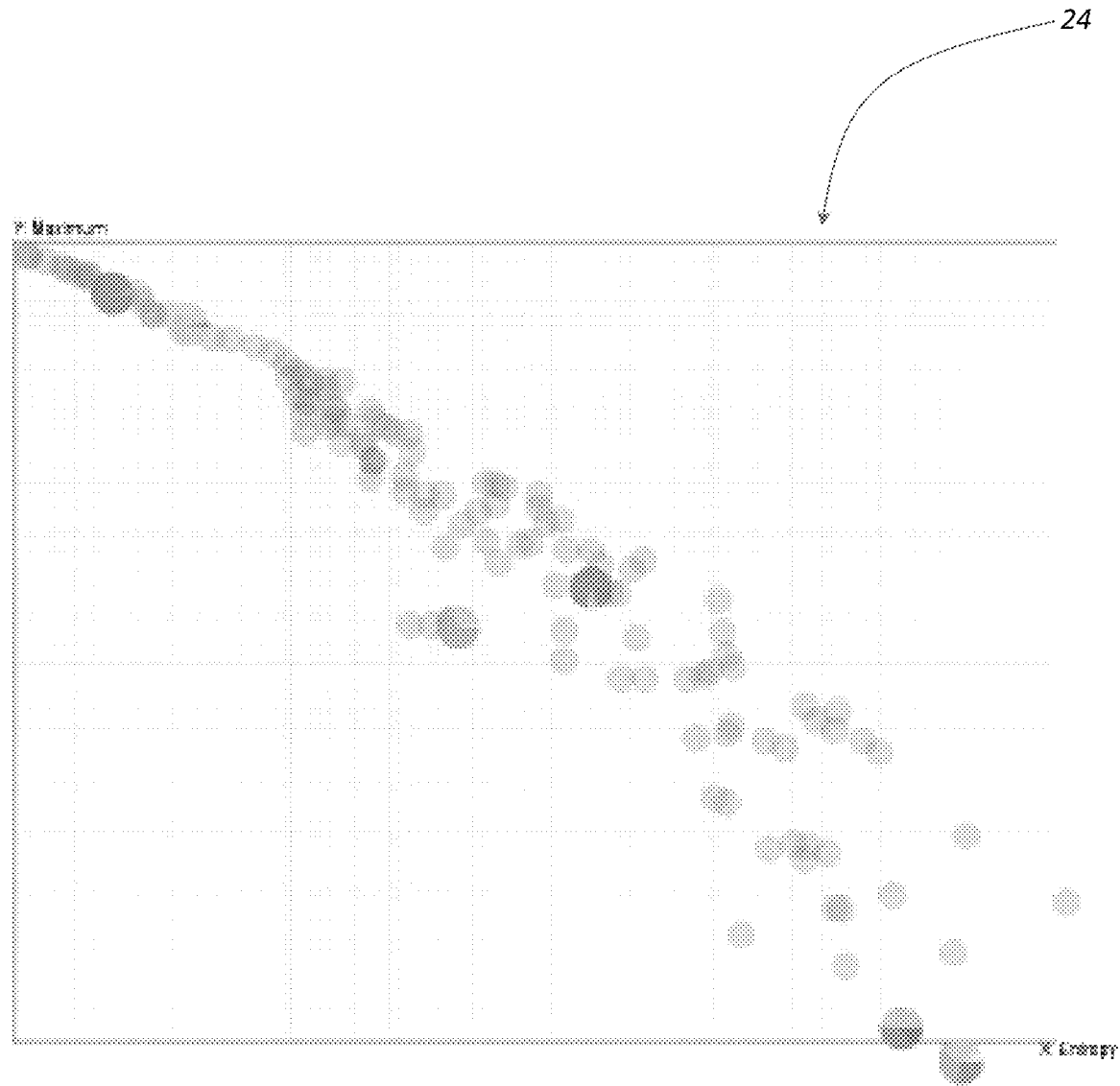
FIG. 5 is an exemplary display illustrating a topic cloud view of the visual text corpora analysis tool of the present invention.

As seen in the document distribution view 18, each document is converted into a signal-like probabilistic distribution pattern. In this representation, documents with multiple topics appear noisier than ones that clearly focus on one topic. In information theory, Shannon entropy is a measure of the amount of uncertainty associated with a random variable. Assuming that a topic is a random variable for each document in our context, Shannon entropy can be used to separate clear signals from noisy ones. Therefore, the tool 10 of the present invention applies Shannon entropy to distinguish documents based on the number of topics that they have. The entropy of each document based on its probabilistic distribution across topics is calculated:

$$H_k = -\sum_{i=1}^{T} P(d_k \mid z = i) \log_2 P(d_k \mid z = i)$$

where $P(d_k)$ is the probabilistic distribution of the kth document over all topics. One can then plot each document based on its entropy and its maximum probability value over topics (normalized to [0, 1]) in the document scatterplot view 24 (see FIG. 5). In this presentation, single-topic documents (with higher maximum value and lower entropy) are at the top left corner of the scatterplot, for example, while the bottom right corner captures documents with higher numbers of topics (with lower maximum value and higher entropy). Upon selection, pie glyphs are shown to describe the topical contribution of a specific document. In FIG. 5, each pie glyph represents a selected document, with each color denoting a topic. As shown, documents with smaller entropy values appear as pie glyphs that are solid circles; whereas documents with larger entropy values appear to have multiple colors, indicating that entropy values correspond to the number of topics in the input documents.

In summary, the document scatterplot view 24 enables users to interactively identify subgroups of documents with desired numbers of topics through the selection of documents within different regions. The document scatterplot view 24 is generated, in part, by a document entropy calculation module 36 that is operable for performing the above functions, as well as the grouping of documents in any given text corpus. The document scatterplot view 24 purposely groups documents based on their entropy and visually illustrates the focus on that given corpus, suggesting whether that corpus focuses on a single subject or transformative subjects.

Figure 6:
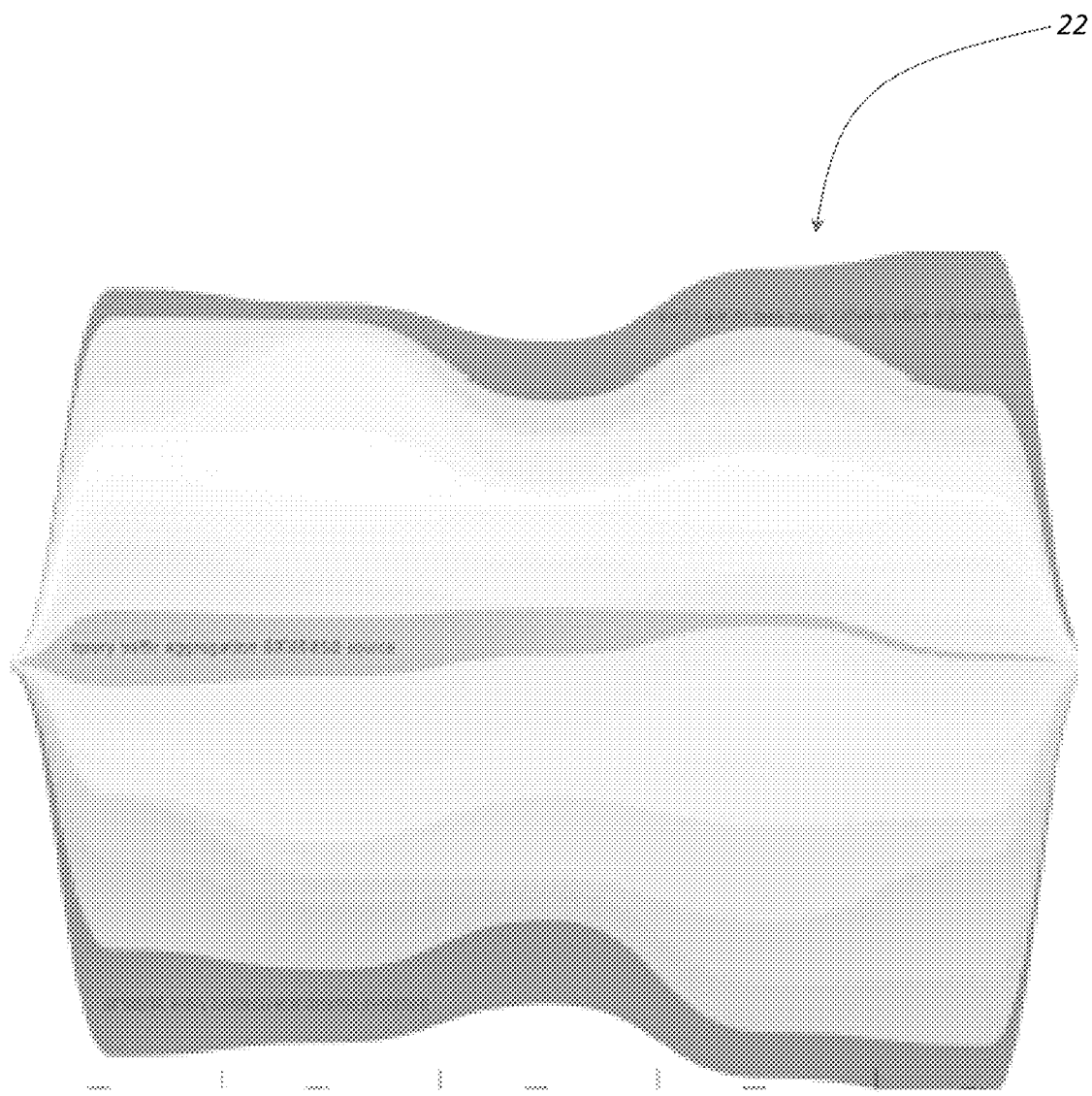
FIG. 6 is an exemplary display illustrating a temporal view of the visual text corpora analysis tool of the present invention.

Since most document collections 16 are accumulated over time, it is helpful to present such temporal information to assist users in understanding how topics of a corpus evolve. Referring now specifically to FIG. 6, the temporal view 22 is created as an interactive ThemeRiver, with each ribbon denoting a topic. In the text corpus, each document is associated with a time stamp, therefore the height of each ribbon over time can be determined by summing the document distribution on this topic within every time frame. The unit of the time frame depends on the corpora, for example, a year might be a proper time unit for scientific publications, while a month or even a day would be more appropriate for news corpora. After the time unit has been chosen, the documents are divided into the corresponding time frame based on the time stamp. Then, for each time frame, the height of each topic is calculated by summing the distribution of the topic from the documents within the time frame.

The order of the topics (from top to bottom) is the same as in both the topic cloud view 20 and document distribution view 18, for example. The topics are assigned colors or patterns by interpolating a color or pattern spectrum using the normalized distance among all adjacent topics. As a result, a more similar pair of topics are assigned colors or patterns that are more alike.

Overall, the temporal view 22 provides a visual summary of how topics of the document collection 16 evolve over time. Beyond the representation, various interactions are supported within the temporal view 22. Selection of a time frame (one vertical time unit) results in the filtering of all documents published within the selected time frame. Similarly, clicking on an intersection of a topic ribbon and a time frame in the temporal view 22 leads to the selection of documents published during the time frame with more than 30% probability on the selected topic, for example. Therefore, one may identify what documents contribute to the rise of a topic in a certain time period. The temporal view 22 adds richness by revealing temporal information hidden in a document collection 16 and allowing users to perform filtering based on time and topic.

The temporal view 22 is generated, in part, by a temporal topic trend calculation module 38 that is operable for performing the above functions, as well as the examination of a detailed document. The temporal view 22 enables users to directly select documents in a certain time range, for example, and retrieves the corresponding data. The temporal view 22 plays a critical role in illustrating the fundamentals of the identified visual patterns and trends to the users by revealing the document details that are associated with such depictions.

Upon the selection of any documents, the tool 10 of the present invention provides details of the actual text content of the documents of interest. Since any topic models are far from perfect, the function of the detail view is two-fold: first, it provides context for users to develop a deep understanding of a topic and its associated keywords; second, it helps users validate the patterns shown in the visualization.

Since making sense of a large text corpus 16 can involve the utilization of all four views, coordination among all the views is carefully crafted. On the topic level, hovering over a topic in any view that involves topic representation highlights the same topic in other views. For example, if a user hovers over an axis in the document distribution view 18, the same topic is highlighted in both the topic cloud view 20 and the temporal view 22. Thus, the user can quickly synthesize information regarding keywords, document distribution, and temporal trend of the particular topic. In addition, the views are also coordinated by colors or patterns, with each topic being the same color or pattern in all views.

On the document level, selecting any set of documents in views that involve individual documents highlights the same set of documents in other views. For example, brushing in the document scatterplot view 20 is immediately reflected in the document distribution view 18, and vice versa. When a user selects a few documents with two prominent topics (i.e. mid-range) in the document scatterplot view 24, seeing the distributions of these documents helps the user understand their topical combinations.

With regard to the temporal aspect, filtering documents that were written/published within a certain time period is supported. For instance, clicking on a time frame (i.e. one vertical time unit) in the temporal view 22 results in the filtering of all documents published within the selected time span. Similarly, clicking on an intersection of a topic ribbon and a time frame in the temporal view 22 leads to the selection of documents published during the time period with the topic accounting for a major contribution (e.g. more than 30% probability) to those documents. Such selection is shown in both the document distribution view 18 and the document scatterplot view 24. This function allows users to filter documents based on time and topic of interest, and then examine the documents published within the selected time frame.

The tool 10 of the present invention allows users to explore and query large document corpora 16 from multiple viewpoints. Starting with the topic cloud view 20, a user can view a summary of the corpus 16 and can identify topics or even keywords of interest. From the document distribution view 18, the user can locate the topic of interest and select documents that focus on this topic by brushing on the vertical axis. The user can then visually identify what other topics the selected set of documents are related to through viewing the distributions in the document distribution view 18 and document scatterplot view 24. Furthermore, the user can always examine details of the documents upon selection. If the user wants to identify interdisciplinary/multidisciplinary publications from the corpus 16, he/she is equipped to do so in the document scatterplot view 24 by selecting documents in the mid to lower right corner, for example. Furthermore, if the user is interested in querying the corpus 16 by temporal factor, he/she can perform selections in the temporal view 22 by either clicking on one time frame or on an intersection of a certain time frame and a topic. In summary, the tool 10 of the present invention employs multiple coordinated views to support the interactive exploration of text corpora 16. Each of the views is designed to address one out of four important questions.

In order to evaluate the efficacy of the tool 10 of the present invention in answering the four intended questions, the tool 10 was applied to exploring and analyzing two text corpora, including the scientific proposals awarded by the National Science Foundation (NSF) and the publications in the IEEE VAST proceedings from 2006 to 2010.

Case Study 1.

Analyzing Science Proposals.

In this case study, we first describe the data we collected. We then characterize the targeted domain and present a set of tasks that are summarized based on our conversations with program managers at NSF. Last, we present how the tool could assist the expert user in solving these tasks.

Data Collection and Preparation.

To examine whether the tool could assist program managers in making funding decisions and managing award portfolios, we first collected the awarded proposals from 2000 to 2010 under the Information & Intelligent Systems (IIS) division, which is part of the Computer & Information Science & Engineering (CISE) directorate. The collection consists of nearly 4,000 awards, with structured data on the Award Number, Directorate, Division, Program, Program Manager, Principal Investigator, and Award Date; as well as Abstract of the proposals, which is in the form of unstructured text. We processed all collected abstracts with each abstract constituting a single document in the corpus. We removed a list of standard stopwords. This gave us a vocabulary of 334,447 words. We then extracted 30 topics from the corpus using the LDA model.

Domain Characterization.

A core part of NSF's mission is to keep the United States at the leading edge of discovery, both by funding research in traditional academic areas, including identifying broader impacts, as well as funding transformative and interdisciplinary research. In order to do the former, the program managers at NSF need to identify appropriate reviewers and panelist to ensure the best possible peer review. In order to effectively perform the latter, the program managers need to identify emerging areas and research topics for funding interdisciplinary and transformative research. In addition to making funding decisions, program managers also need to manage their award portfolios. While the program managers have done a great job in the past, they are in need of new methods to help them due to the rapidly changing nature of science, and the significant increase in the number of proposals submitted. Mapping the high-level mission to actionable items, we designed three tasks that are related to decision-making and award portfolio analysis. Task 1 focuses on dividing new proposal submissions into groups based on their topics. This task requires understanding the major topics of the text corpus, and filtering sub-document collections based on their characteristics over topics. Task 2 is to identify appropriate reviewers for the proposal submissions, which further involves knowing whether a submission is related to multiple topics in order to gather the right expertise. Last, Task 3 focuses on the temporal aspect of the award portfolios which involves discovering the topical trend over time.

Expert Evaluation.

Since program managers at NSF are extremely busy, we invited a former NSF program manager for our expert evaluation. The participant has two years of experience working as a program manager at NSF. At the beginning of the evaluation, we spent 30 minutes demonstrating the system design and functionality of each visualization. Then, we asked the participant to perform the following three tasks using the tool.

Task 1.

To Group 200 Newly Submitted Proposals Based on Topics.

Starting with the topic cloud view, the participant quickly scanned the extracted topics to gain an overview of the newly submitted proposals. Since the participant was responsible for proposals in the areas of robotics and computer vision, she quickly focused her attention on these two topics. Upon selection of the proposals that focus on the topic regarding robotics, the participant quickly glanced over the titles in the detail view to validate their relevancy. While the participant was making sure that each selected proposal was relevant, she also noticed that the positions of the proposals are scattered in the document scatterplot view. Since the proposals in the lower right positions are more likely to contain two or more topics, the participant was interested in knowing what other topics these proposals relate to. Through further filtering the proposals that appear to be more interdisciplinary in the document scatterplot view, the participant found that they are related to other fields such as neuroscience and social communication. Upon selecting the relevant document in the document distribution view, the detail view is invoked so that the program manager can look for previously awarded PIs.

Task 2.

To Identify Appropriate Reviewers.

For the purpose of identifying reviewers, the participant first wanted to roughly divide the proposals into groups. Based on the initial exploration, the participant concluded that there are roughly two groups of proposals: one group that focus on the core of robotics area, and the other that utilized body of knowledge from other fields such as neuroscience and social communication. To identify reviewers for the two groups of proposals, the participant would like to find PIs from previously awarded proposals. Through examining the historic data, the program manager located the topic regarding robotics in the document distribution view. She then brushed the top range of the axis to select proposals pertinent to the topic. Finally, the participant turned to the detail view to look for PIs that were previously awarded in the robotics area. For interdisciplinary proposals in Group 2, the participant went through similar processes to identify additional experts from other related field (e.g. neuroscience) to serve on the review panel to ensure the best possible peer review.

Task 3.

Analyzing Temporal Trend of Award Portfolio.

On a portfolio level, the former program manager was interested in seeing the temporal trend of the areas she is in charge of over the years. Through exploring the temporal view, the participant discovered that the trend of awarded proposals in the field of robotics is steady, although the overall number of proposal awarded grew during year 2006 and 2009. Unlike the steady trend of robotics, the number of awarded proposals on the topic of "using technology to help people with disability" grew over the years. The former program manager commented that this view is valuable to her since it enabled her to see funding trends regarding different topics that are otherwise hard to discover.

In summary, the participant thought each view in the tool is well designed with a clear purpose. She commented that the tool could play a facilitating role in a program manager's workflow. In particular, she liked the fact that our tool could automatically suggest proposals that are more interdisciplinary since this was difficult to judge traditionally. She also liked coordination between views, which helped her to quickly synthesize information from different aspects of the same corpus.

Case Study 2.

Analyzing VAST Conference Proceedings.

As the field of visual analytics matures, it is helpful to review how the field has evolved. One means to approach this problem is to analyze the publications that have been accepted by the most important venue in visual analytics. In this case study, we recruited four researchers to explore articles published in the VAST conference/symposium since the field began in 2006. Since all users were familiar with the field of visual analytics, we wanted to encourage free exploration as opposed to following well-structured tasks. After the evaluation, we categorized the findings from the participants into two groups: discovering causal relationship between temporal evolution of topics and funding sources and learning about interesting subfields in the realm of visual analytics.

Data Collection and Preparation.

We first collected all articles published in the VAST conference/symposium from 2006 to 2010. A total number of 123 publications were collected. We then parsed each publication into fields including Title, Author, Year Published, Abstract, Body, and References. We performed topic modeling on the full body of each paper (from introduction to conclusion) with each paper constituting a document in the corpus. Removing standard stopwords left us a vocabulary of 317,315 words. Based on our tally of different tracks for every VAST conference, we extracted 19 topics from the corpus.

User Evaluation.

Among the four researchers we recruited, two are senior researchers in the field of visual analytics and the other two are Ph.D. students with visual analytics as their main research interest. In this evaluation, we provided all participants a high-level task and encouraged more free exploration. After introducing the tool, we asked each participant to identify core topics within the field and how the field has evolved over the course of last 5 years. We roughly categorized the usage patterns into two groups: identifying rising/falling topics and using the system as an educational tool.

Identifying Rising/Falling Topics.

After glancing through all topics in the topic cloud view, one senior researcher commented that the topics conform well to the paper tracks from the VAST conferences. When viewing the temporal trend of each topic, the participant noticed a few clear rising and falling patterns. For instance, the topic on video news analysis attracted lots of interest at the beginning, but the interest quickly diminished over the years. He also noticed a similar trend on the topic regarding network traffic monitoring and analysis. Associating the patterns with his knowledge, the participant explained the trends as when the field began, the areas of interest were guided by the Department of Homeland Security (DHS), which is the primary funding source at the time. Next, the participant turned to the rising patterns which indicate interests in those topics grew over the years. In particular, both topic trend and uncertainty analysis and topic dimensionality analysis and reduction attracted more interests since year 2008. Again associating the patterns with his own knowledge, the participant commented that this is likely the outcome of the Foundations of Data and Visual Analytics (FODAVA) program introduced by the NSF and DHS jointly.

Learning about the Field of Visual Analytics.

The other senior researcher who was teaching a visual analytics course at the time commented that he can see the tool being useful for his class. Students could explore all VAST publications and identify papers that related to topics of interest for course presentation. Similarly, another participant wanted to see what has been done on text analysis in the field of visual analytics. He first located the topic and then selected publications that ranked high on this topic in the document distribution view. He quickly glanced through the paper titles in the detailed view and validated all papers selected were of his interest. He also noticed that some papers within the selection appear related to other topics such as entity extraction and database queries. After the study, he asked for a screen capture of the detailed view so that he could look for the papers he identified during the study.

In summary, the participants considered the tool to be useful in helping them explore the evolution of the field of visual analytics and identify publications for further investigation based on their own interest.

It will be appreciated by those of ordinary skill in the art that the various modules and processes of the present invention are implemented using computers and like processing devices. Such computers and like processing devices can include one or more generic or specialized processors, such as microprocessors, digital signal processors, customized processors, and field programmable gate arrays (FPGAs), and unique stored program instructions (including both software and firmware) that control the one or more processors, to implement, in conjunction with certain non-processor circuits, some, most, or all of the functions of the methods and systems of the present invention. Alternatively, some or all functions can be implemented by a state machine that has no stored program instructions, or in one or more application specific integrated circuits (ASICs), in which each function or some combinations of certain of the functions are implemented as custom logic. Of course, a combination of the aforementioned approaches may be used.

Moreover, some exemplary embodiments can be implemented via a non-transitory computer-readable storage medium having computer readable code stored thereon for programming a computer, server, appliance, device, etc., each of which may include a processor to perform functions as described and claimed herein. Examples of such computer-readable storage media include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), a Flash memory, and/or the like. When stored in the non-transitory computer readable medium, software can include instructions executable by a processor that, in response to such execution, cause the processor and/or any other circuitry to perform a set of operations, steps, methods, processes, algorithms, etc.

Again, the present invention enables companies, including analysts, marketers, business unit leaders, information technology personnel, and the C-suite, to gain actionable insight from any type of textual data. The technology allows people to augment their decision making processes from data driven foundations. The technology ingests textual data and, through deep computing and statistical algorithms, identifies the themes, topics, and emerging issues within each data set. Results are displayed in an interactive, visualized format so that anyone in the company can analyze data holistically or granularly. All types of textual data can be analyzed—internal data, such as emails, chats, surveys, call centers, and focus groups, or external data, such as social media, review sites, forums, and news sites. The technology can process a multitude of languages, ensuring that feedback loops from around the world can be analyzed. The highly customizable features let one tailor analysis efforts however is chosen. Most companies are sitting on treasure troves of unstructured textual data with little ability to mine it for intelligence.

Figure 7:
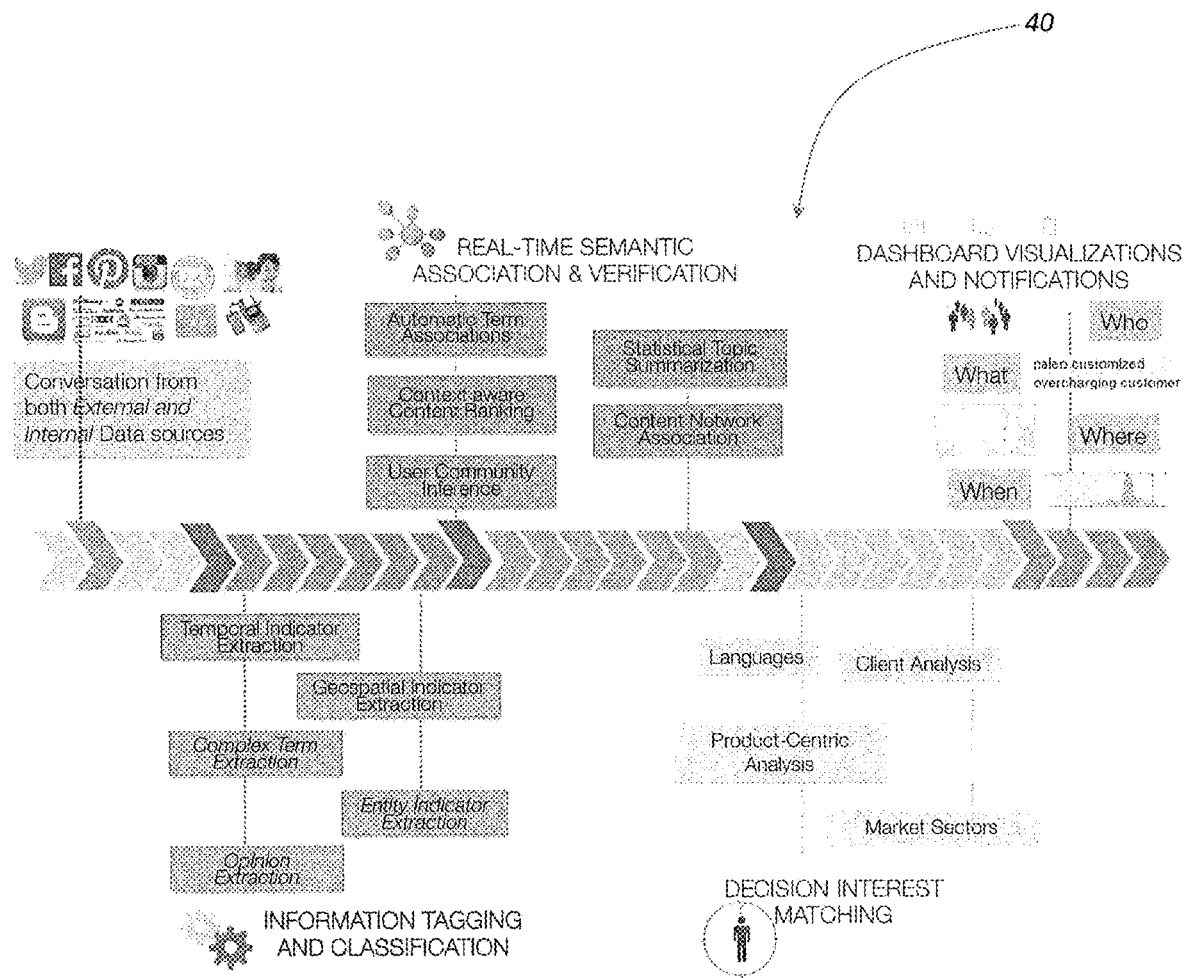
FIG. 7 is a schematic diagram illustrating one exemplary embodiment of the unstructured data analytics system of the present invention.

In general, the software of the present invention delivers deep learning based data analysis in a sophisticated visual platform that uncovers, analyzes, and hypothesizes actionable strategies in a wide range of business decision areas. It links call center audio, email, news, social media, chat, transactional data, customer feedback, and analytics in powerful ways that discover connections within data that impact marketing, customer service, operations, and risk analysis stakeholders. Structured data is also leveraged, including retail transactions, survey data, personal profiles, etc., as well as national and international industry, government, and product specific data sources. The software is accessible by any browser means, integrating predictive modeling, artificial intelligence, and statistical NLP to analyze any type of unstructured data. Visualization is provided holistically and/or granularly. The overall system 40 is illustrated, schematically, in FIG. 7. The system 40 utilizes a high throughput multi-lingual API for information tagging, with complex term extraction, entity indicator extraction, geospatial indicator extraction, temporal indicator extraction, and opinion sentiment analysis. The system 40 also utilizes data driven semantic machine learning and clustering, with automatic term associations, statistical topic summarization, influencer inference, context aware content ranking, content network association, and product-centric analysis.

Figure 8:
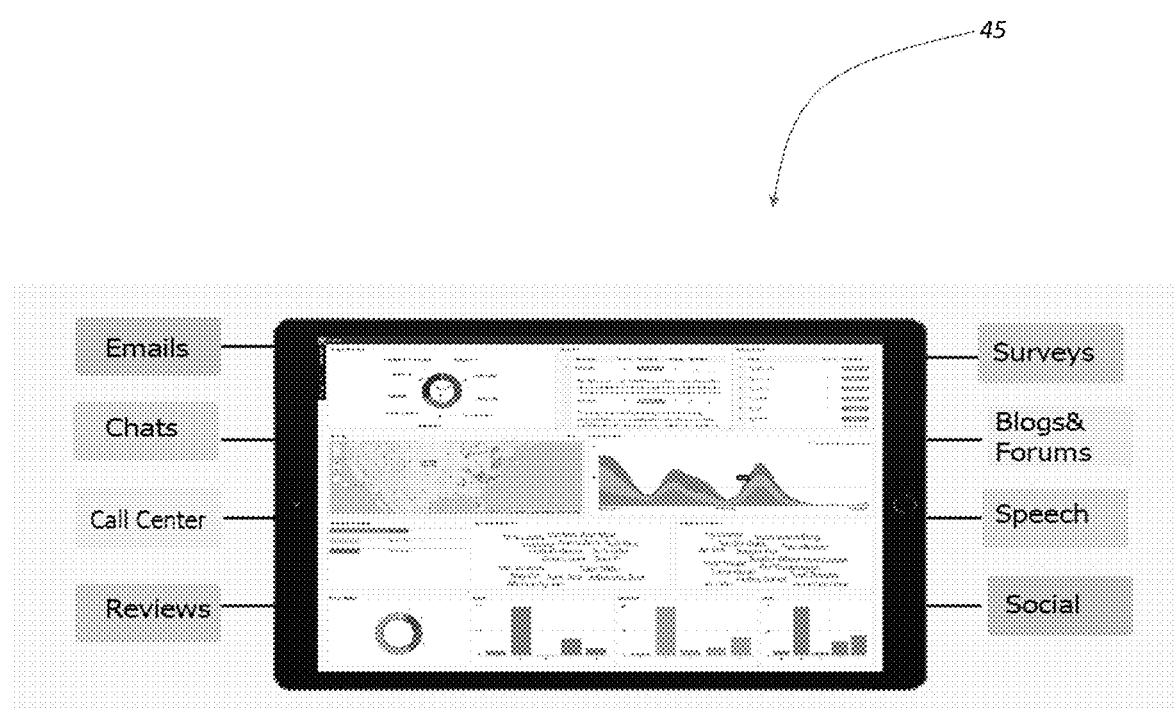
FIG. 8 is a schematic diagram illustrating another exemplary embodiment of the unstructured data analytics system of the present invention.
Figure 9:
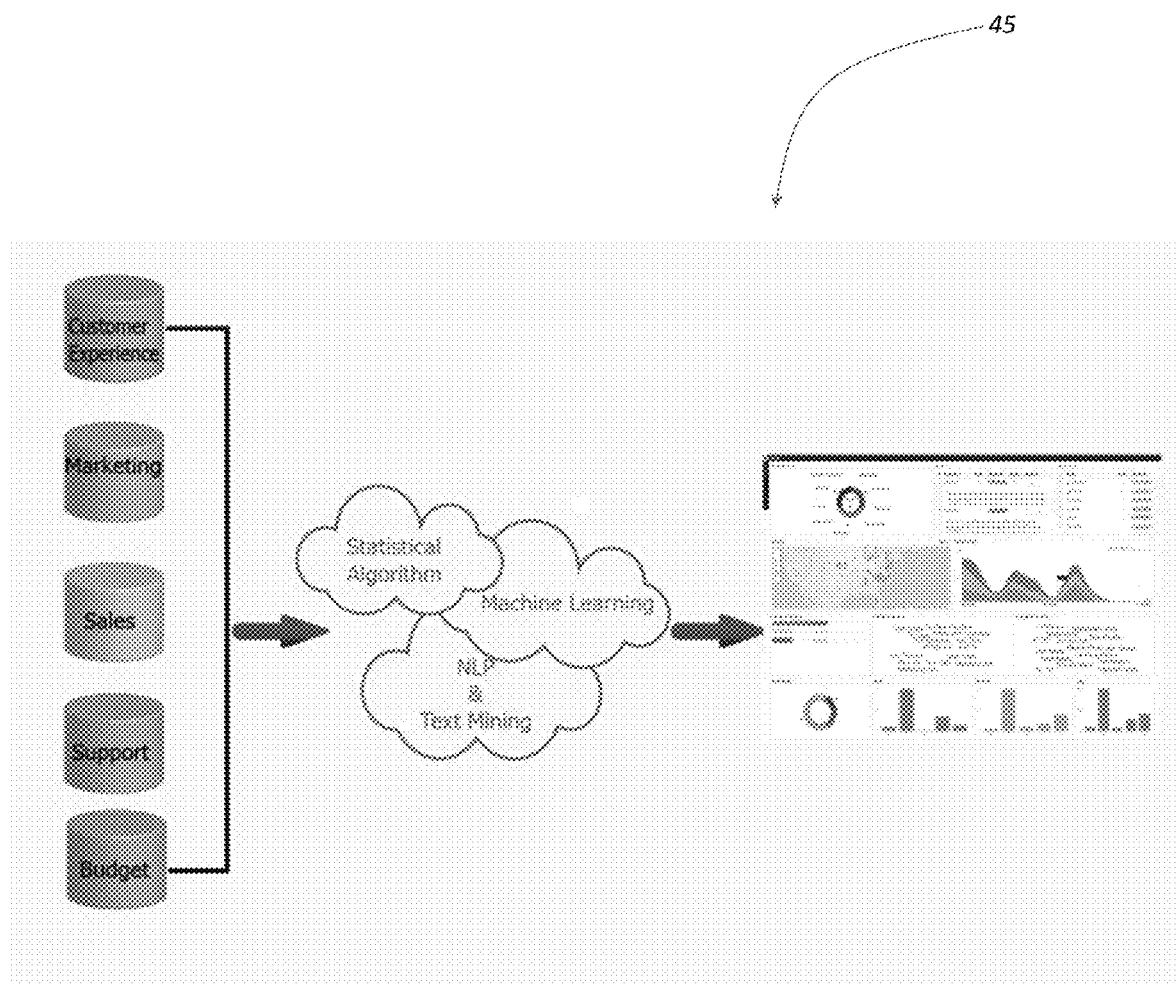
FIG. 9 is a schematic diagram illustrating a further exemplary embodiment of the unstructured data analytics system of the present invention.

Referring now specifically to FIGS. 8 and 9, in one exemplary embodiment, the present invention provides an augmented intelligence platform 45 that helps companies find the shortest path from data to revenue. It brings their fragmented data silos together, creates a unified visual analytics layer on top, and enables users from multiple business functions to effectively and collaboratively extract valuable insight. The platform 45 sits securely on top of organizational data lake and is compatible with multitude degrees of data infrastructures. It automatically ingests unstructured data (e.g., email, call logs) as well as structured data (e.g., sales, budget, financial) through deep computing and statistical algorithms. It handles tens of millions of feedback and data points in real time, and identifies the themes, topics, and emerging issues within an organization. It helps dynamically correlate the customer experience trends with all corporate data. The platform 45 is fully interactive and easy to use. Anyone in an organization, people from frontline employees, analysts, marketers to business unit leaders and C-Suites, can interact with data holistically or granularly, customize their own dashboard, and share findings with others. Aside from a data analytics backend engine, the platform 45 is also bolstered with a completely enhanced users' UI experience. The present invention provides users with a pixel-perfect dashboard with customizable visualizations. This makes presenting users' analytics work so much easier and more controllable. The rich interaction in the exploration layer allows users to quickly dive into analytics details and maintain the contextual information around it. The present invention secures and flexible data analytics environment ensures that users never lose contact with the data at large while diving into the details. It goes beyond just a couple of visualizations; extending users experiences to various useful data analytics and visualizations. Annotating and collaborating on analytics efforts is never easier. The present invention completely revamps the way in which people can find, share, and collaborate on analytics tasks. Users are able to annotate and share their findings with colleagues, enabling collaboration within and outside of every data analytics group. All in all, the present invention augments decision-making by providing an immersive environment of data analytics.

Figure 10:
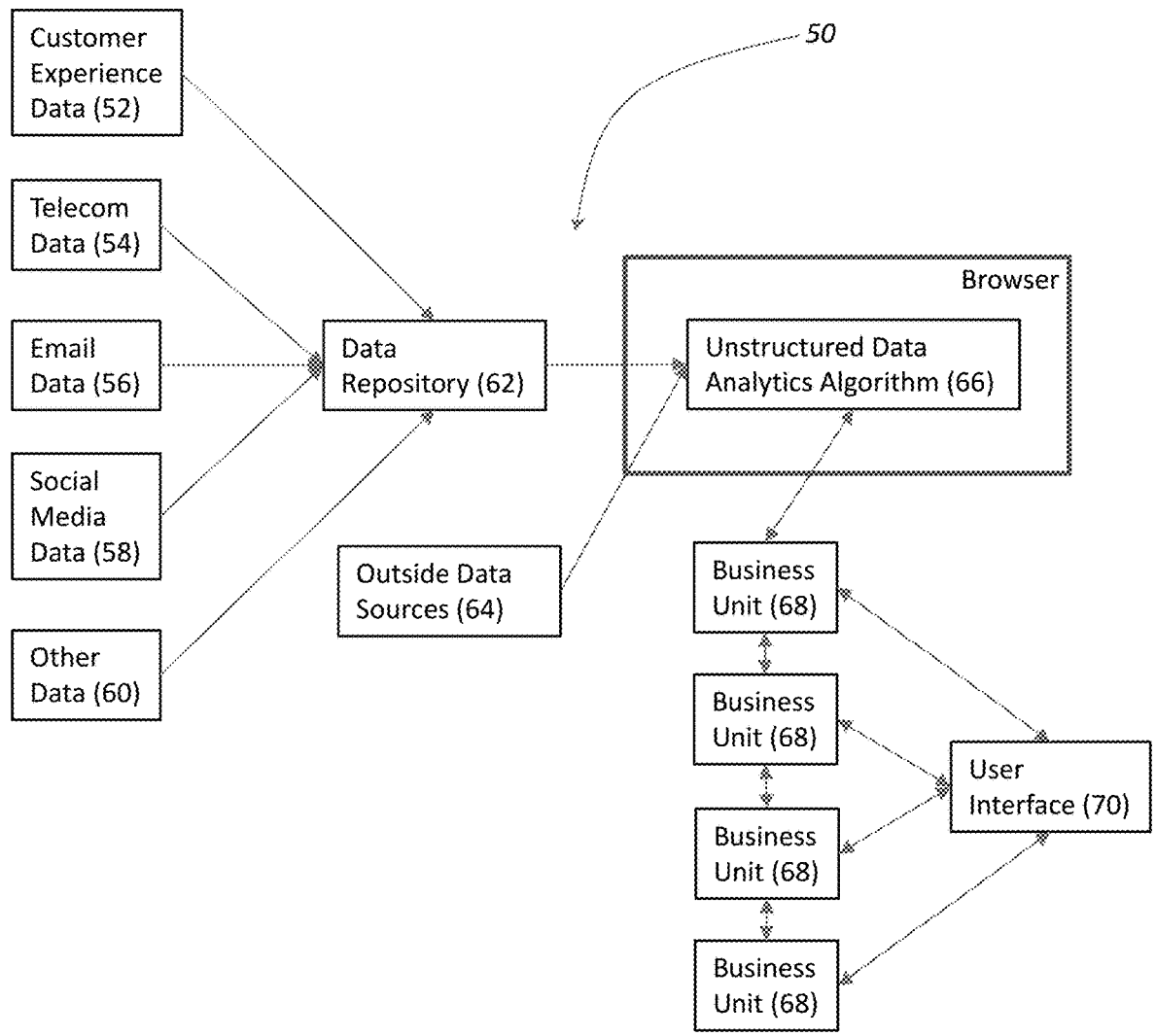
FIG. 10 is a schematic diagram illustrating another exemplary embodiment of the unstructured data analytics system of the present invention.

FIG. 10 is a schematic diagram illustrating another exemplary embodiment of the unstructured data analytics system 50 of the present invention. In general, customer experience data 52, telecom data 54, email data 56, social media data 58, and other data 60 germane to a business enterprise, for example, are aggregated in a data repository 62 and, along with outside data sources 64, such as Internet data, governmental data, etc., are pulled into the unstructured data analytics algorithm 66, which is resident on a web server and accessible via a browser, for example. As described in detail herein above, the unstructured data analytics algorithm 66 applies predictive modeling, artificial intelligence, and statistical NLP to the data to uncover, analyze, hypothesize, and visualize actionable information. Advantageously, this actionable information may be viewed by various business units 68, stakeholders, or other users, all of who may add to or otherwise modify the visualization and share the results via a common interactive user interface 70.

Figure 11:
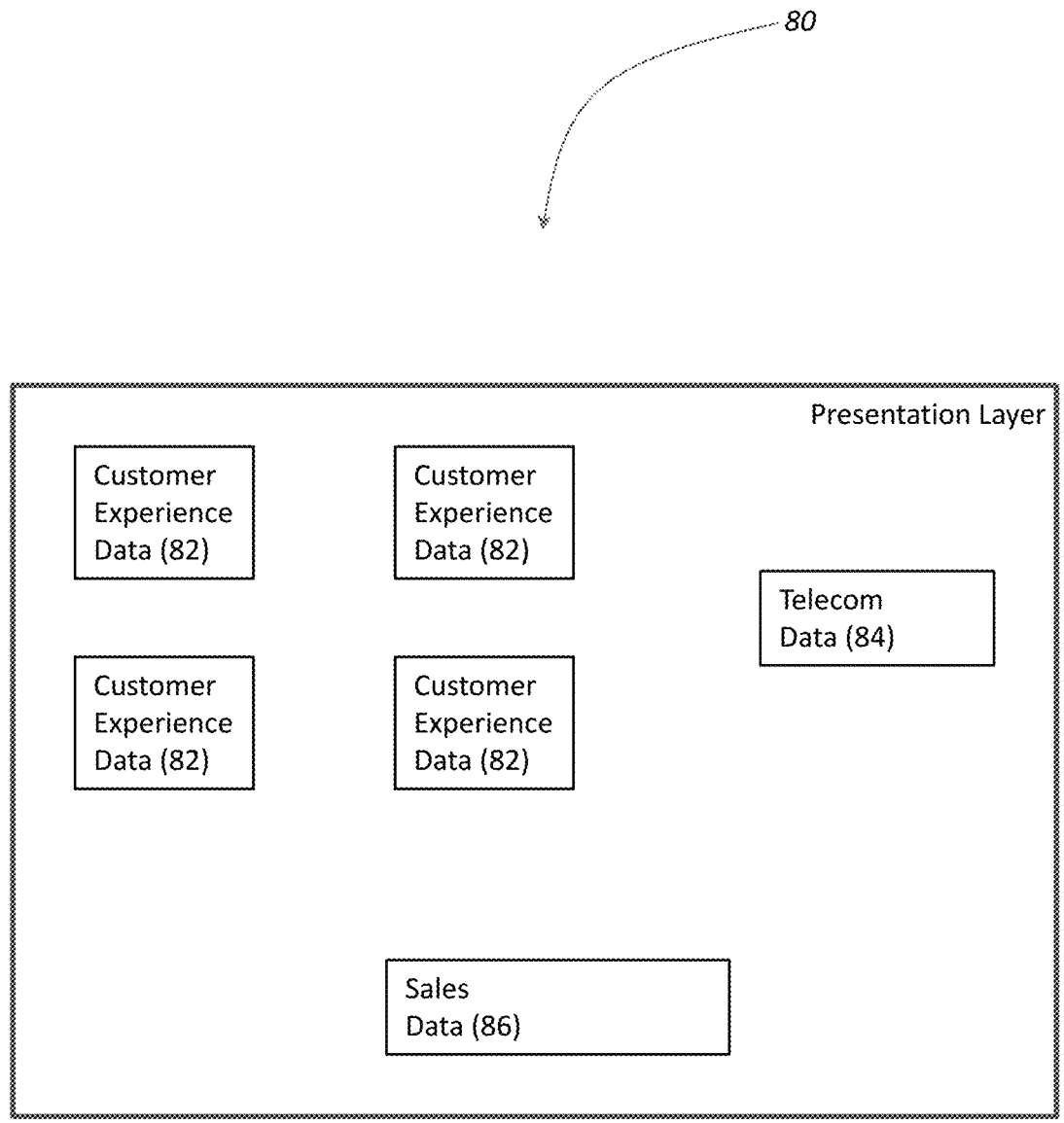
FIG. 11 is a schematic diagram illustrating one exemplary embodiment of a presentation layer of the unstructured data analytics system of the present invention.

FIG. 11 is a schematic diagram illustrating one exemplary embodiment of a presentation layer 80 of the unstructured data analytics system 50 (FIG. 8) of the present invention. In general, the presentation layer 80 allows a variety summary information with regard to the unstructured data and/or results to be displayed. For example, the presentation layer 80 is shown displaying customer experience data 82, telecom data 84, and sales data 86.

Figure 12:
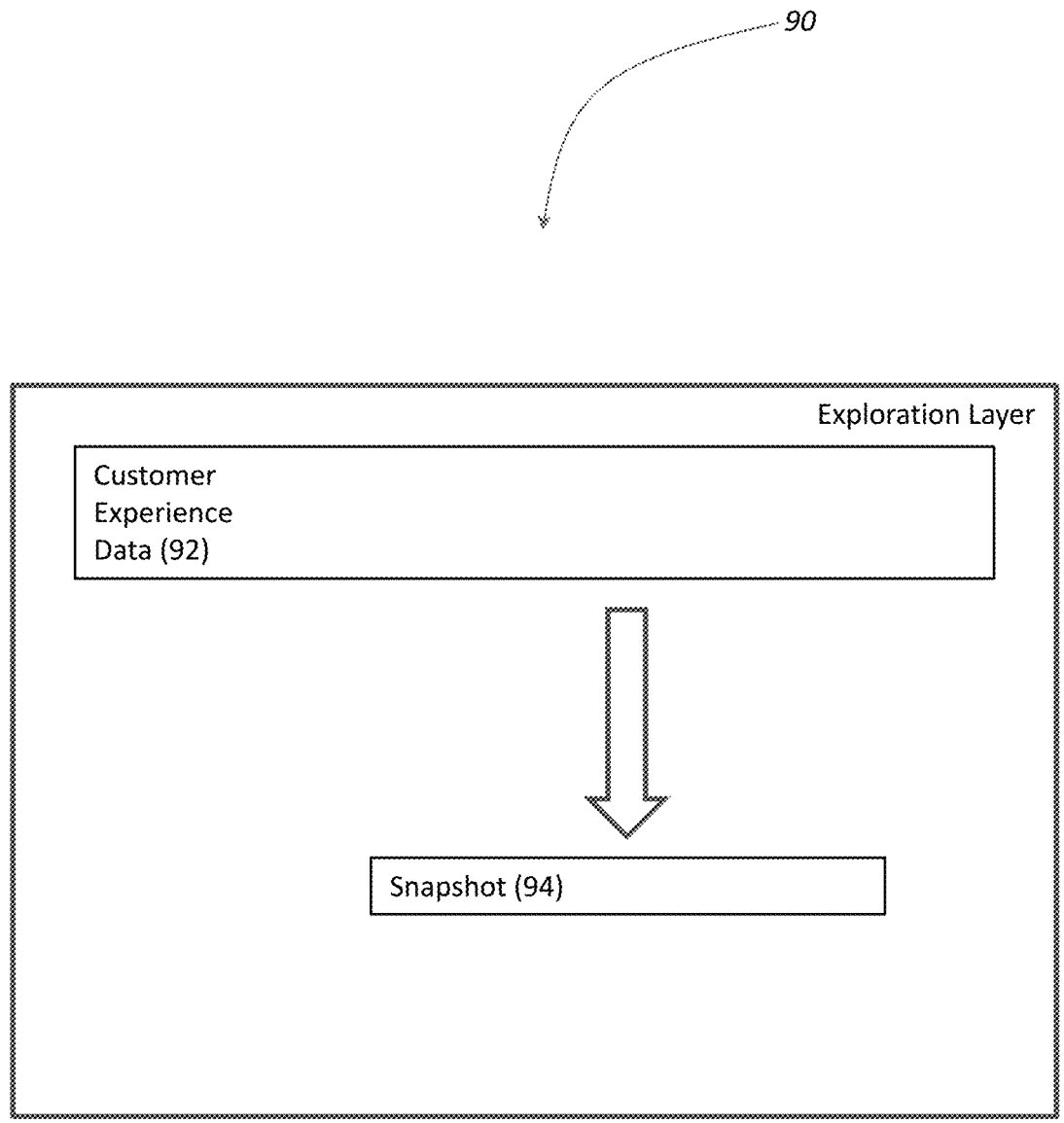
FIG. 12 is a schematic diagram illustrating one exemplary embodiment of an exploration layer of the unstructured data analytics system of the present invention.

FIG. 12 is a schematic diagram illustrating one exemplary embodiment of an exploration layer 90 of the unstructured data analytics system 50 (FIG. 8) of the present invention. In general, the exploration layer 90 also allows a variety summary information with regard to the unstructured data and/or results to be displayed. The exploration layer 90 also allows a temporal granularity to be selected and displayed in greater detail. Such "drill down" also updates other visualization accordingly, including the presentation layer 80. For example, a snapshot 94 is shown being selected from customer experience data 92.

Figure 13:
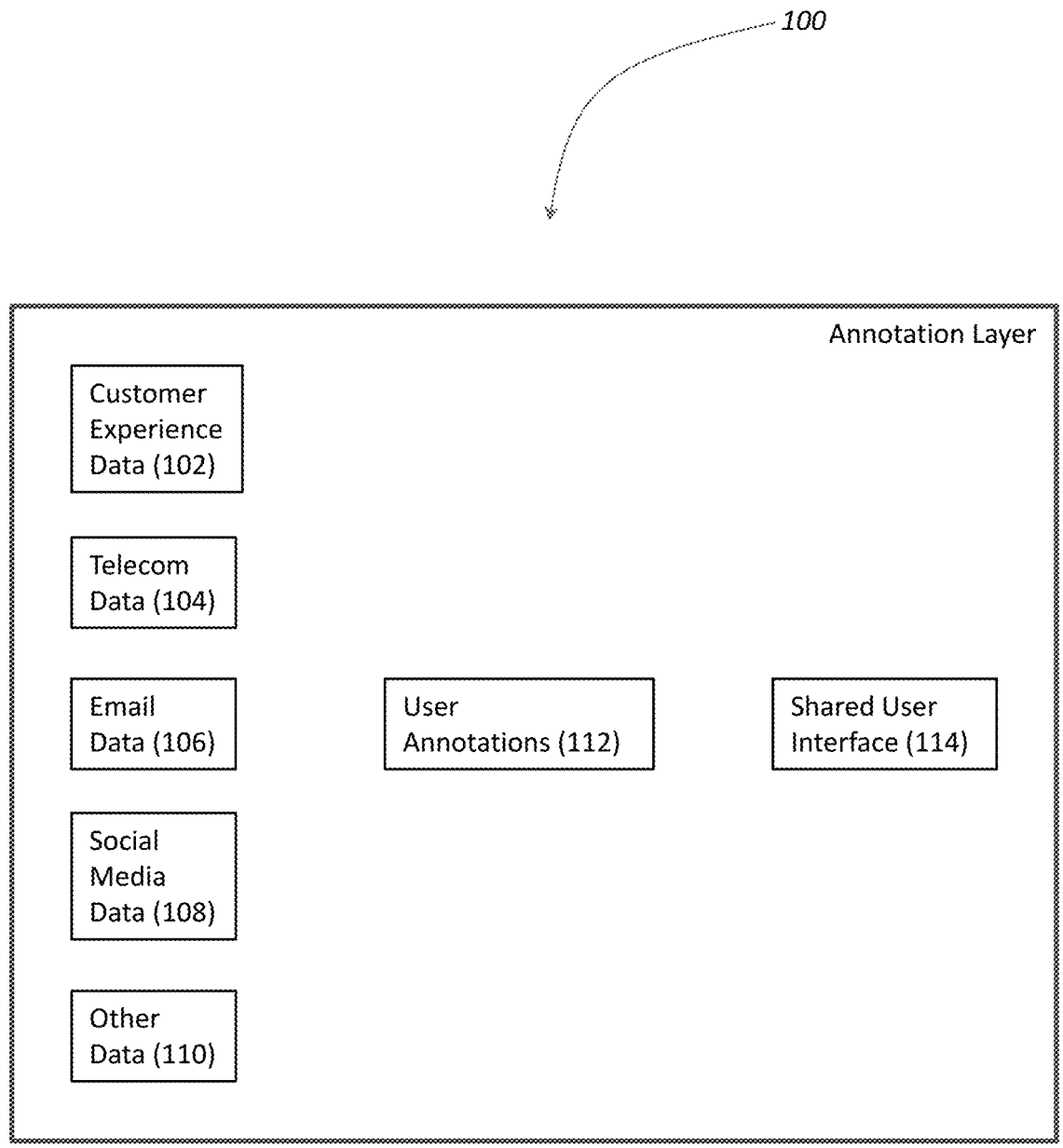
FIG. 13 is a schematic diagram illustrating one exemplary embodiment of an annotation layer of the unstructured data analytics system of the present invention.

FIG. 13 is a schematic diagram illustrating one exemplary embodiment of an annotation layer 100 of the unstructured data analytics system 50 (FIG. 8) of the present invention. The annotation layer 100 is configured to display various results, as well as customer experience data 102, telecom data 104, email data 106, social media data 108, other data 110, and the like, and accept user annotations 112 that are accessible to all users, or selected users, via a shared user interface 114.

Figure 14:
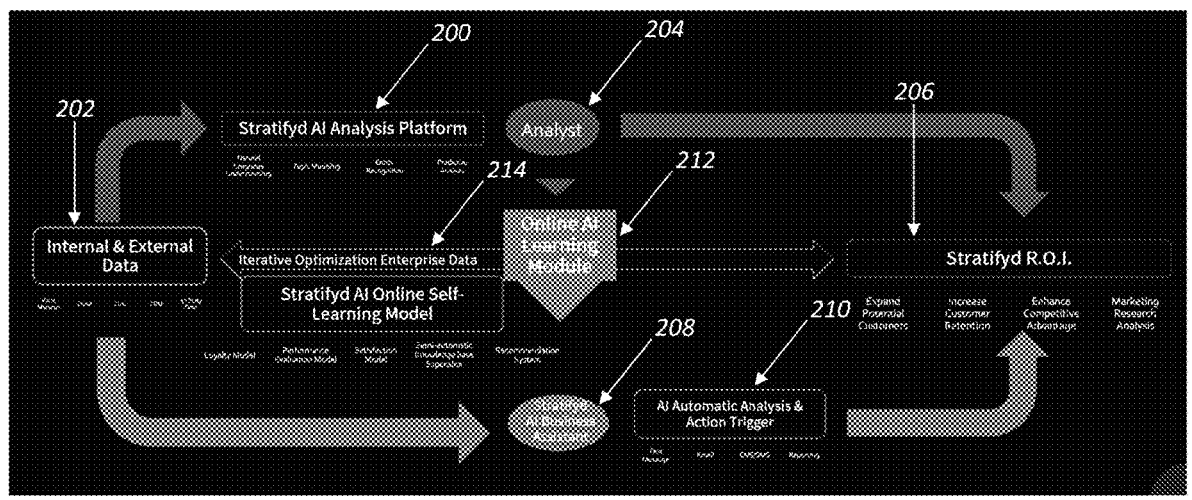
FIG. 14 is a schematic diagram illustrating one exemplary embodiment of the interplay of the AI learning module of the present invention and the data analysis tool of the present invention.

Referring now specifically to FIG. 14, in one exemplary embodiment, the data analysis platform 200 of the present invention, described in full detail herein above, utilizes internal and external data (structured and/or unstructured) 202, such as voicemail data, email data, customer relationship management (CRM) data, third party data, and the like to guide an analyst 204 in making decisions and performing actions that benefit the company 206, by, for example, expanding potential customers, increasing customer retention, enhancing competitive advantage, and gaining marketing research analysis. The data analysis platform 200 performs natural language understanding, topic modeling, entity recognition, and predictive analysis. Advantageously, an AI business assistant module 208 is provided that applies AI to new data and automatically executes actions on behalf of the analyst 204 and/or company 206 using an AI analysis and action trigger 210. Such actions may include, but are not limited to, sending text messages, sending emails, customer marketing strategy/service marketing strategy (CMS/SMS) actions, and reporting functions. For example, the AI business assistant module 208 and AI analysis and action trigger 210 can process incoming communications and score customer representatives, providing them with real time performance suggestions, and then provide individualized customer follow up automatically based on the analyzed interactions. Again, this benefits the company 206, by, for example, expanding potential customers, increasing customer retention, enhancing competitive advantage, and gaining marketing research analysis, with limited involvement of the analyst 204, thereby increasing the efficiency of the analyst 204. Importantly, an online AI learning module 212 is provided for the use of the analyst 204 such that the operation of the AI business assistant module 208 and AI analysis and action trigger 210 can be customized to the analyst 204 and enhanced. This effectively shifts company AI to an analyst level for enhanced performance. The AI learning module 212 correlates incoming textual (or other) data, whether structured or unstructured, to an AI determined score built with a statistically selected model by an AI learning model 214. The analyst 204 may select the model to be applied based on the statistical scoring. This implements, for example, a loyalty model, a performance evaluation model, a satisfaction model, a knowledge base expansion model, a recommendation system model, etc. Finally, iterative optimization of enterprise data is performed as a result of this interaction. In general, AI methodologies that may be implemented include, but are not limited to, decision trees, naive Bayes classification, ordinary least squares regression, logistic regression, support vector machines, ensemble methods, clustering algorithms, principal component analysis (PCA), singular value decomposition, and independent component analysis.

Figure 15:
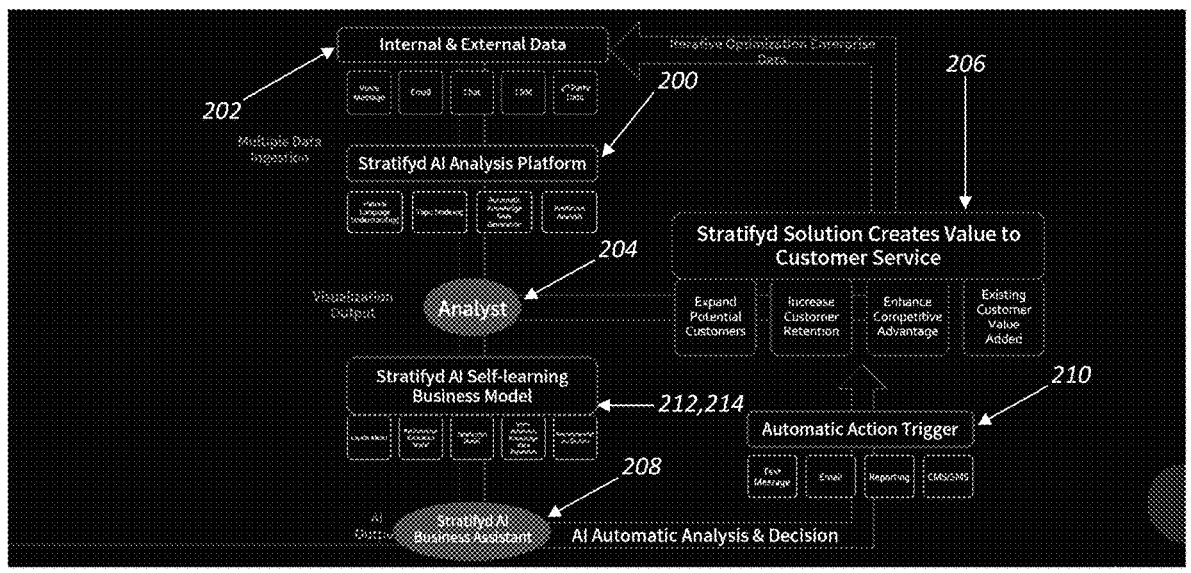
FIG. 15 is another schematic diagram further illustrating one exemplary embodiment of the interplay of the AI learning module of the present invention and the data analysis tool of the present invention.

Referring now specifically to FIG. 15, in an alternate representation conceptually showing a data ingestion layer or function, a visualization layer or function, and an AI layer or function, the data analysis platform 200 of the present invention, described in full detail herein above, utilizes internal and external data (structured and/or unstructured) 202, such as voicemail data, email data, CRM data, third party data, and the like to guide an analyst 204 in making decisions and performing actions that benefit the company 206, by, for example, expanding potential customers, increasing customer retention, enhancing competitive advantage, and gaining marketing research analysis. The data analysis platform 200 performs natural language understanding, topic modeling, entity recognition, and predictive analysis. Advantageously, an AI business assistant module 208 is provided that applies AI to new data and automatically executes actions on behalf of the analyst 204 and/or company 206 using an AI analysis and action trigger 210. Such actions may include, but are not limited to, sending text messages, sending emails, CMS/SMS actions, and reporting functions. For example, the AI business assistant module 208 and AI analysis and action trigger 210 can process incoming communications and score customer representatives, providing them with real time performance suggestions, and then provide individualized customer follow up automatically based on the analyzed interactions. Again, this benefits the company 206, by, for example, expanding potential customers, increasing customer retention, enhancing competitive advantage, and gaining marketing research analysis, with limited involvement of the analyst 204, thereby increasing the efficiency of the analyst 204. Importantly, an online AI learning module 212 is provided for the use of the analyst 204 such that the operation of the AI business assistant module 208 and AI analysis and action trigger 210 can be customized to the analyst 204 and enhanced. This effectively shifts company AI to an analyst level for enhanced performance. The AI learning module 212 correlates incoming textual (or other) data, whether structured or unstructured, to an AI determined score built with a statistically selected model by an AI learning model 214. The analyst 204 may select the model to be applied based on the statistical scoring. This implements, for example, a loyalty model, a performance evaluation model, a satisfaction model, a knowledge base expansion model, a recommendation system model, etc. Finally, iterative optimization of enterprise data is performed as a result of this interaction. In general, AI methodologies that may be implemented include, but are not limited to, decision trees, naive Bayes classification, ordinary least squares regression, logistic regression, support vector machines, ensemble methods, clustering algorithms, PCA, singular value decomposition, and independent component analysis.

Figure 16:
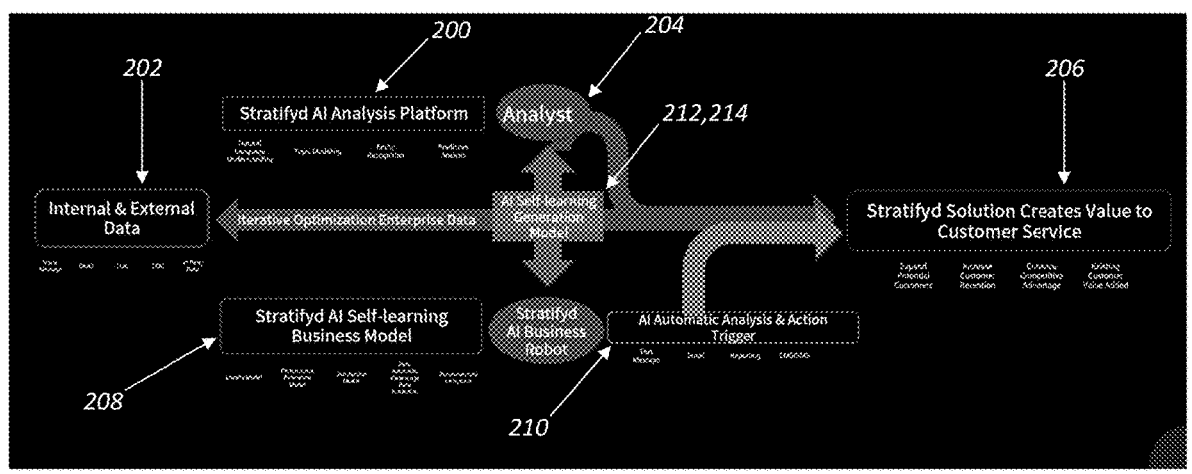
FIG. 16 is a further schematic diagram further illustrating one exemplary embodiment of the interplay of the AI learning module of the present invention and the data analysis tool of the present invention.

Referring now specifically to FIG. 16, in another alternate representation conceptually showing a data ingestion layer or function, a visualization layer or function, and an AI layer or function, the data analysis platform 200 of the present invention, described in full detail herein above, utilizes internal and external data (structured and/or unstructured) 202, such as voicemail data, email data, CRM data, third party data, and the like to guide an analyst 204 in making decisions and performing actions that benefit the company 206, by, for example, expanding potential customers, increasing customer retention, enhancing competitive advantage, and gaining marketing research analysis. The data analysis platform 200 performs natural language understanding, topic modeling, entity recognition, and predictive analysis. Advantageously, an AI business assistant module 208 is provided that applies AI to new data and automatically executes actions on behalf of the analyst 204 and/or company 206 using an AI analysis and action trigger 210. Such actions may include, but are not limited to, sending text messages, sending emails, CMS/SMS actions, and reporting functions. For example, the AI business assistant module 208 and AI analysis and action trigger 210 can process incoming communications and score customer representatives, providing them with real time performance suggestions, and then provide individualized customer follow up automatically based on the analyzed interactions. Again, this benefits the company 206, by, for example, expanding potential customers, increasing customer retention, enhancing competitive advantage, and gaining marketing research analysis, with limited involvement of the analyst 204, thereby increasing the efficiency of the analyst 204. Importantly, an online AI learning module 212 is provided for the use of the analyst 204 such that the operation of the AI business assistant module 208 and AI analysis and action trigger 210 can be customized to the analyst 204 and enhanced. This effectively shifts company AI to an analyst level for enhanced performance. The AI learning module 212 correlates incoming textual (or other) data, whether structured or unstructured, to an AI determined score built with a statistically selected model by an AI learning model 214. The analyst 204 may select the model to be applied based on the statistical scoring. This implements, for example, a loyalty model, a performance evaluation model, a satisfaction model, a knowledge base expansion model, a recommendation system model, etc. Finally, iterative optimization of enterprise data is performed as a result of this interaction. In general, AI methodologies that may be implemented include, but are not limited to, decision trees, naive Bayes classification, ordinary least squares regression, logistic regression, support vector machines, ensemble methods, clustering algorithms, PCA, singular value decomposition, and independent component analysis.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby for all purposes, and are intended to be covered by the following non-limiting claims.

What is claimed is:

1. An artificial intelligence data analytics system, comprising:
   a data analytics algorithm accessible by an analyst operable for receiving data from one or more sources, applying one or more analytical tools to the data, and displaying summary information to the analyst;
   an artificial intelligence algorithm accessible by the analyst operable for applying a preferred artificial intelligence methodology to the data and automatically triggering and executing an action on behalf of the analyst, wherein the action is customizable for the analyst; and
   an artificial intelligence learning algorithm accessible by the analyst operable for statistically scoring a plurality of potential artificial intelligence methodologies to be used by the artificial intelligence algorithm, wherein statistically scoring the plurality of potential artificial intelligence methodologies comprises correlating the data to preexisting statistically scored artificial intelligence methodologies, receiving a corresponding analyst preference as to the preferred artificial intelligence methodology, and causing the artificial intelligence algorithm to utilize the preferred artificial intelligence methodology, wherein in response to utilizing the preferred artificial intelligence methodology, the preferred artificial intelligence methodology is included in the preexisting statistically scored artificial intelligence methodologies for processing subsequently received data.

2. The artificial intelligence data analytics system of claim 1, wherein the data comprises one or more of internal data and external data relative to an entity.

3. The artificial intelligence data analytics system of claim 1, wherein the data analytics algorithm performs natural language understanding, topic modeling, entity recognition, and predictive analysis.

4. The artificial intelligence data analytics system of claim 1, wherein the action triggered and executed on behalf of the analyst by the artificial intelligence algorithm comprises one or more of sending a text message, sending an email, performing a customer marketing strategy/service marketing strategy action, scoring the analyst, and performing a reporting function.

5. The artificial intelligence data analytics system of claim 1, wherein the artificial intelligence learning algorithm implements one or more of a loyalty model, a performance evaluation model, a satisfaction model, a knowledge base expansion model, and a recommendation system model.

6. The artificial intelligence data analytics system of claim 1, wherein the data is iteratively optimized based on feedback from the artificial intelligence learning algorithm such that the statistical scores of the plurality of potential artificial intelligence methodologies are improved.

7. The artificial intelligence data analytics system of claim 1, wherein the artificial intelligence methodology implemented includes one or more of a decision tree, a naive Bayes classification, an ordinary least squares regression, a logistic regression, a support vector machine, an ensemble method, a clustering algorithm, a principal component analysis, a singular value decomposition, and an independent component analysis.

8. A method for providing an artificial intelligence data analytics system, comprising:
   providing a data analytics algorithm accessible by an analyst operable for receiving data from one or more sources, applying one or more analytical tools to the data, and displaying summary information to the analyst;
   providing an artificial intelligence algorithm accessible by the analyst operable for applying a preferred artificial intelligence methodology to the data and automatically triggering and executing an action on behalf of the analyst, wherein the action is customizable for the analyst; and
   providing an artificial intelligence learning algorithm accessible by the analyst operable for statistically scoring a plurality of potential artificial intelligence methodologies to be used by the artificial intelligence algorithm, wherein statistically scoring the plurality of potential artificial intelligence methodologies comprises correlating the data to preexisting statistically scored artificial intelligence methodologies, receiving a corresponding analyst preference as to the preferred artificial intelligence methodology, and causing the artificial intelligence algorithm to utilize the preferred artificial intelligence methodology, wherein in response to utilizing the preferred artificial intelligence methodology, the preferred artificial intelligence methodology is included in the preexisting statistically scored artificial intelligence methodologies for processing subsequently received data.

9. The method of claim 8, wherein the data comprises one or more of internal data and external data relative to an entity.

10. The method of claim 8, wherein the data analytics algorithm performs natural language understanding, topic modeling, entity recognition, and predictive analysis.

11. The method of claim 8, wherein the action triggered and executed on behalf of the analyst by the artificial intelligence algorithm comprises one or more of sending a text message, sending an email, performing a customer marketing strategy/service marketing strategy action, scoring the analyst, and performing a reporting function.

12. The method of claim 8, wherein the artificial intelligence learning algorithm implements one or more of a loyalty model, a performance evaluation model, a satisfaction model, a knowledge base expansion model, and a recommendation system model.

13. The method of claim 8, further comprising iteratively optimizing the data based on feedback from the artificial intelligence learning algorithm such that the statistical scores of the plurality of potential artificial intelligence methodologies are improved.

14. The method of claim 8, wherein the artificial intelligence methodology implemented includes one or more of a decision tree, a naive Bayes classification, an ordinary least squares regression, a logistic regression, a support vector machine, an ensemble method, a clustering algorithm, a principal component analysis, a singular value decomposition, and an independent component analysis.

* * * * *